US007476710B2

(12) United States Patent
Mehta et al.

(10) Patent No.: US 7,476,710 B2
(45) Date of Patent: *Jan. 13, 2009

(54) HETEROGENEOUS POLYMER BLENDS AND MOLDED ARTICLES THEREFROM

(75) Inventors: Aspy K. Mehta, Humble, TX (US); Sudhin Datta, Houston, TX (US); Wen Li, Houston, TX (US); Srivatsan S. Iyer, Pearland, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 550 days.

This patent is subject to a terminal disclaimer.

(21) Appl. No.: 11/298,145

(22) Filed: Dec. 9, 2005

(65) Prior Publication Data

US 2006/0173132 A1 Aug. 3, 2006

Related U.S. Application Data

(60) Provisional application No. 60/637,429, filed on Dec. 17, 2004, provisional application No. 60/655,612, filed on Feb. 22, 2005.

(51) Int. Cl.
*C08L 23/00* (2006.01)
*C08L 23/04* (2006.01)

(52) U.S. Cl. ...................... 525/191; 525/240
(58) Field of Classification Search ................. 525/191, 525/240
See application file for complete search history.

(56) References Cited

U.S. PATENT DOCUMENTS

| | | |
|---|---|---|
| 3,262,992 A | 7/1966 | Holzer et al. |
| 3,378,606 A | 4/1968 | Kontos |
| 3,853,969 A | 12/1974 | Kontos |
| 3,882,197 A | 5/1975 | Fritz et al. |
| 3,888,949 A | 6/1975 | Shih |
| 4,461,872 A | 7/1984 | Su |
| 4,665,130 A | 5/1987 | Hwo |
| 4,921,749 A | 5/1990 | Bossaert et al. |
| 5,079,273 A | 1/1992 | Kuroda et al. |
| 5,171,628 A | 12/1992 | Arvedson et al. |
| 5,213,744 A | 5/1993 | Bossaert |
| 5,290,635 A | 3/1994 | Matsumura et al. |
| 5,298,561 A | 3/1994 | Cecchin et al. |
| 5,331,047 A | 7/1994 | Giacobbe |
| 5,453,318 A | 9/1995 | Giacobbe |
| 5,504,172 A | 4/1996 | Imuta et al. |
| 5,652,308 A | 7/1997 | Merrill et al. |
| 5,723,217 A | 3/1998 | Stahl et al. |
| 5,726,103 A | 3/1998 | Stahl et al. |
| 5,736,465 A | 4/1998 | Stahl et al. |
| 5,763,080 A | 6/1998 | Stahl et al. |
| 5,891,814 A | 4/1999 | Richeson et al. |
| 5,910,362 A | 6/1999 | Aratake et al. |
| 5,959,006 A | 9/1999 | Pungtrakul |
| 5,994,482 A | 11/1999 | Georgellis et al. |
| 6,010,588 A | 1/2000 | Stahl et al. |
| 6,017,615 A | 1/2000 | Thakker et al. |
| 6,080,818 A | 6/2000 | Thakker et al. |
| 6,096,420 A | 8/2000 | Wilhoit et al. |
| 6,143,818 A | 11/2000 | Wang et al. |
| 6,153,703 A | 11/2000 | Lustiger et al. |
| 6,165,599 A | 12/2000 | Demeuse |
| 6,187,449 B1 | 2/2001 | Sasaki et al. |
| 6,342,565 B1 | 1/2002 | Cheng et al. |
| 6,388,013 B1 | 5/2002 | Saraf et al. |
| 6,476,135 B1 | 11/2002 | Bugada et al. |
| 6,500,563 B1 | 12/2002 | Datta et al. |
| 6,503,588 B1 | 1/2003 | Hayashi et al. |
| 6,525,157 B2 | 2/2003 | Cozewith et al. |
| 6,531,214 B2 | 3/2003 | Carter et al. |
| 6,583,076 B1 | 6/2003 | Pekrul et al. |
| 6,635,715 B1 | 10/2003 | Datta et al. |
| 6,642,316 B1 | 11/2003 | Datta et al. |
| 6,747,114 B2 | 6/2004 | Karandinos et al. |
| 6,750,284 B1 | 6/2004 | Dharmarajan et al. |

(Continued)

FOREIGN PATENT DOCUMENTS

EP 0 373 660 6/1990

(Continued)

OTHER PUBLICATIONS

Collette, John W. et al., Journal of Macromolecules, vol. 22, 1989,"Elastomeric Polypropylenes from Alumina-Supported Tetraalkyl Group IVB Catalysts. 1. Synthesis and Properties of High Molecular Weight Stereoblock Homopolymers", pp. 3851-3858 and 2. Chain Microstructure, Crystallinity, and Morphology, pp. 3858-3866.

*Primary Examiner*—Nathan M Nutter

(57) ABSTRACT

This invention relates to a molded article comprising a heterogeneous blend that includes:
1) from 60 to 99 weight percent of one or more semi-crystalline propylene homopolymers or copolymers having a melting point between 100 and 170 °C. and a melt flow rate of 200 dg/min or less; and
2) from 1 to 40 weight % of one or more semi-amorphous propylene/$C_2$ and/or $C_4$ to $C_{10}$ α-olefin copolymers each having a particular heat of fusion, a melt flow rate, intermolecular compositional distribution as determined by thermal fractionation in hexane, Mw/Mn, and propylene triad tacticity such that the molded part formed from the resulting blend has improved notched impact strength, flexibility, elongation, and resistance to stress whitening at a thickness of from 250 μpm to 10 mm.

87 Claims, 2 Drawing Sheets

U.S. PATENT DOCUMENTS

| | | |
|---|---|---|
| 6,800,692 B2 | 10/2004 | Farley et al. |
| 6,875,485 B2 | 4/2005 | Kanai et al. |
| 6,887,941 B2 | 5/2005 | Zhou |
| 6,900,147 B2 | 5/2005 | Morman et al. |
| 6,906,160 B2 | 6/2005 | Stevens et al. |
| 6,921,794 B2 | 7/2005 | Cozewith et al. |
| 6,984,696 B2 | 1/2006 | Curry et al. |
| 7,319,077 B2 * | 1/2008 | Mehta et al. ............... 442/361 |
| 2003/0213938 A1 | 11/2003 | Farley et al. |
| 2004/0122388 A1 | 6/2004 | McCormack et al. |
| 2005/0106978 A1 | 5/2005 | Cheng et al. |
| 2006/0178483 A1 * | 8/2006 | Mehta et al. ............... 525/240 |
| 2006/0183860 A1 * | 8/2006 | Mehta et al. ............... 525/191 |
| 2007/0282073 A1 * | 12/2007 | Weng et al. ............... 525/240 |

FOREIGN PATENT DOCUMENTS

| | | |
|---|---|---|
| EP | 0 374 695 | 6/1990 |
| EP | 0 400 333 | 12/1990 |
| EP | 462 574 | 12/1991 |
| EP | 0 629 631 | 12/1994 |
| EP | 0 629 632 | 12/1994 |
| EP | 1 002 814 | 5/2000 |
| EP | 1 003 814 | 5/2000 |
| EP | WO 00/69965 | 11/2000 |
| EP | 1 223 191 | 7/2002 |
| EP | 1 505 181 | 2/2005 |
| GB | 2 061 339 | 5/1981 |
| WO | WO 94/28042 | 12/1994 |
| WO | WO 99/07788 | 2/1999 |
| WO | WO 99/19547 | 4/1999 |
| WO | WO 00/00564 | 1/2000 |
| WO | WO 00/01745 | 1/2000 |
| WO | WO 00/01766 | 1/2000 |
| WO | WO 00/69963 | 11/2000 |
| WO | WO 00/70134 | 11/2000 |
| WO | WO 01/48034 | 7/2001 |
| WO | WO 02/083753 | 10/2002 |
| WO | WO 03/021569 | 3/2003 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 2004/035681 | 4/2004 |
| WO | WO 2004/060994 | 7/2004 |
| WO | WO 2004/087806 | 10/2004 |
| WO | WO 2005/052052 | 6/2005 |
| WO | WO 2006/065649 | 6/2006 |

* cited by examiner

Figure 1: AFM micrograph of Heterogeneous Blend Example 3-2
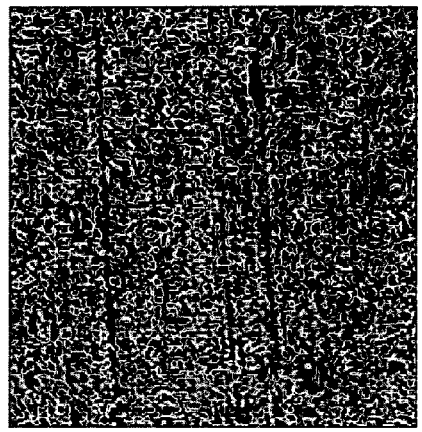
20% of 14.5% $C_2$ SAPEC in PP
Field of view: 5 μm x 5 μm
Figure 2A: Dynamic Mechanical Thermal Analysis (DMTA) Testing on
Examples 3-1 to 3-4 (bottom to top)
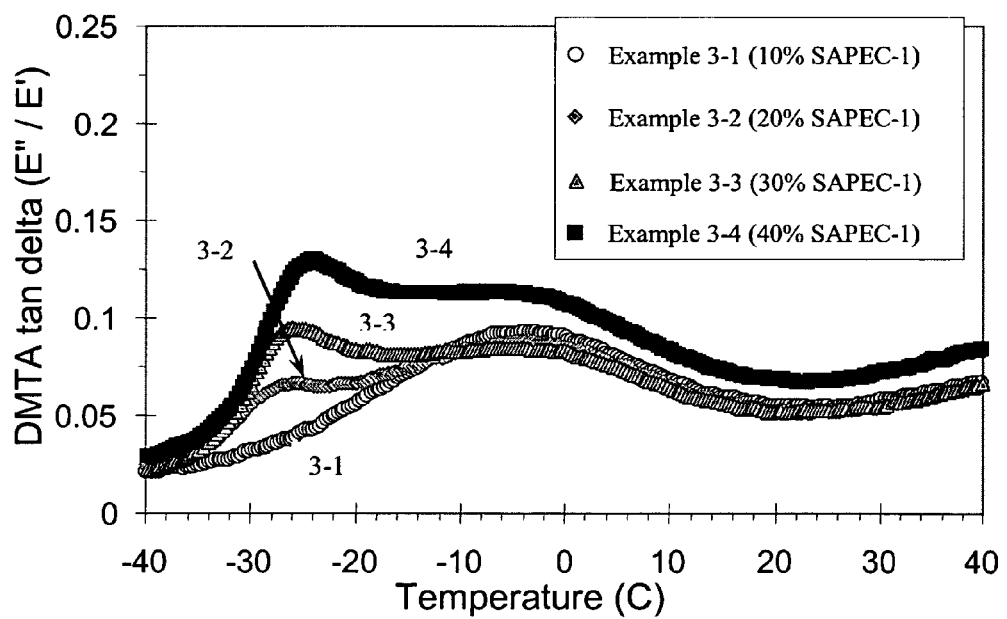

Figure 2B: Dynamic Mechanical Thermal Analysis (DMTA) Testing On Example 4-1
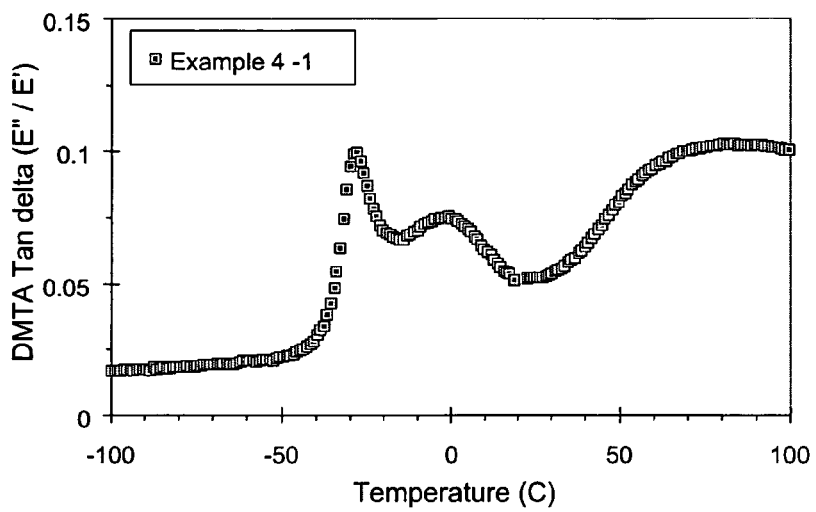
Figure 3: AFM micrographs on Blend Examples 3-4 (no clarifying agent) and 4-7 (with clarifying agent)
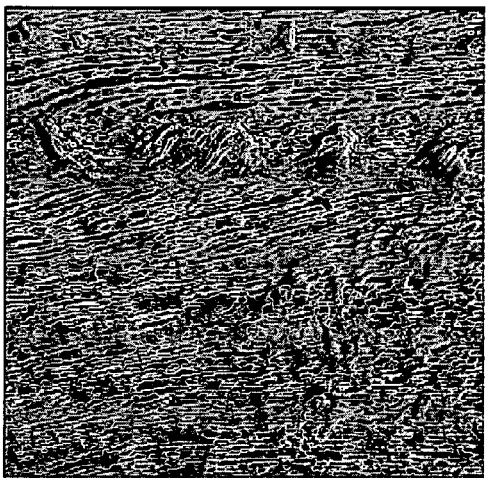
Example 3-4
(40% visbroken SAPEC-1)
No clarifying agent
Field of view : 20 μm x 20 μm
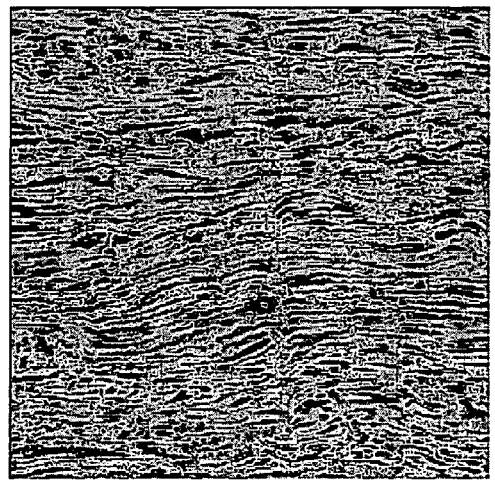
Example 4-7
(40% visbroken SAPEC-2)
With clarifying agent
Field of view : 20 μm x 20 μm

HETEROGENEOUS POLYMER BLENDS AND MOLDED ARTICLES THEREFROM

PRIORITY CLAIM

This application claims the benefit of U.S. Ser. No. 60/637,429, filed Dec. 17, 2004 and U.S. Ser. No. 60/655,612 filed Feb. 22, 2005.

STATEMENT OF RELATED CASES

This application is related to U.S. Ser. No. 10/716,306, filed Nov. 18, 2003. This invention is also related to copending U.S. application Ser. No. 10/402,275 filed Mar. 28, 2003.

FIELD OF THE INVENTION

This invention relates to polymer blends and articles made therefrom including molded articles.

BACKGROUND

Isotactic polypropylene and ethylene/propylene copolymers are often used in the industry to produce articles such as fibers, films, molded parts and nonwoven fabrics. Additionally, blending these polymers with other polymers has also been the subject of past endeavors.

For example, U.S. Pat. No. 3,262,992 suggests the addition of a stereoblock copolymer of ethylene and propylene (having high crystalline melting points) to isotactic polypropylene leads to improved mechanical properties of the blend compared to isotactic polypropylene alone.

U.S. Pat. Nos. 3,853,969 and 3,378,606, suggest the formation of in situ blends of isotactic polypropylene and "stereo block" copolymers of propylene and another olefin of 2 to 12 carbon atoms, including ethylene and hexene.

U.S. Pat. No. 3,882,197 suggests blends of stereoregular propylene/alpha-olefin copolymers, stereoregular propylene, and ethylene copolymer rubbers.

U.S. Pat. No. 3,888,949 suggests the synthesis of blend compositions containing isotactic polypropylene and copolymers of propylene and an alpha-olefin, containing between 6-20 carbon atoms, which have improved elongation and tensile strength over either the copolymer or isotactic polypropylene. Copolymers of propylene and alpha-olefin are described wherein the alpha-olefin is hexene, octene or dodecene.

U.S. Pat. No. 4,461,872, discloses a blend produced in part by the use of another heterogeneous catalyst system which is expected to form copolymers which have statistically significant intramolecular and intermolecular compositional differences.

Two publications in the Journal of Macromolecules, 1989, volume 22, pages 3851-3866 describe blends of isotactic polypropylene and partially atactic polypropylene which purportedly have desirable tensile elongation properties.

U.S. Pat. Nos. 5,723,217; 5,726,103; 5,736,465; 5,763,080; and 6,010,588 suggest several metallocene catalyzed processes to make polypropylene to produce fibers and fabric. U.S. Pat. No. 5,891,814, discloses a dual metallocene-generated propylene polymer used to make spunbond fibers. WO 99/19547 discloses a method for producing spunbonded fibers and fabric derived from a blend of a propylene homopolymer and a copolymer of polypropylene.

U.S. Pat. No. 6,342,565 and its equivalent WO 00/070134 disclose, at Table 4, column 24, fibers comprising 80, 90, and 95 weight % of Achieve 3854 and 20, 10 and 5 weight %, respectively of a propylene/ethylene copolymer having 13.5% ethylene and an ML of 12. These particular blends are not made into films, molded articles or non-woven materials. The fibers in Table 4 are reported to be inelastic and are unsuitable in the elastic applications desired in U.S. Pat. No. 6,342,565.

U.S. Pat. Nos. 6,525,157; 5,504,172; and WO 00/01745 disclose various propylene/ethylene copolymers. US 2003/0130430 discloses blends of two different propylene/ethylene copolymers. U.S. Pat. No. 6,642,316, WO00/070134, WO 00/01766, U.S. Pat. Nos. 6,500,563; 6,342,565, 6,500,563 and WO 00/69963 disclose elastic blends of crystalline polypropylene and propylene/ethylene copolymers. U.S. Pat. No. 6,153,703 discloses blends of semicrystalline copolymers and propylene ethylene polymers having very high toughness without loss in modulus. EP 0 629 632 and EP 0 629 631 disclose blends of polypropylene and ethylene-propylene copolymers having certain triad tacticities and proportions of inversely inserted propylene units.

U.S. Pat. No. 6,635,715 and its equivalents EP 1 003 814 B1 and WO 99/07788 disclose blends of polypropylene and Escorene 4292 with propylene/ethylene copolymers for use as thermoplastic elastomers.

EP 0 374 695 A1 discloses visually homogeneous blends of an ethylene-propylene copolymer and Profax™ 6331 by Basell.

U.S. Pat. No. 6,750,284 discloses thermoplastic membranes comprising propylene-ethylene copolymers and up to 40 wt % polypropylene.

WO 03/040095, WO 03/040201, WO 03/040233, and WO 03/040442 disclose various propylene-ethylene copolymers made with non-metallocene catalyst compounds. WO 03/040202 discloses films and sealants made from the propylene-ethylene copolymers made with non-metallocene catalyst compounds.

Additional references of interest include WO 94/28042, EP 1 002 814, WO 00/69965, WO 01/48034, WO04035681A2, EP 0 400 333 B1, EP 0 373 660 B1, WO04060994A1, U.S. Pat. Nos. 5,453,318, 5,298,561, and 5,331,047.

This invention is also related to copending U.S. application Ser. No. 10/402,275 filed Mar. 28, 2003.

However, none of the above disclose heterogeneous blends having a balanced set of properties comprising toughness (down to 0° C.), flexibility and clarity while still maintaining good crystallizability for convenient fabrication under polypropylene conditions. Further it is desirable to provide molded articles that show little or no stress whitening.

SUMMARY

This invention relates to a molded article comprising a heterogeneous blend comprising:

1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 200 dg/min or less (preferably 1 to 100 dg/min or less); and 2) from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and/or C4 to C10 alpha-olefin comonomers, said semi-amorphous polymers each having:

a) a heat of fusion of 4 to 70 J/g; and b) a melt flow rate of 0.1 to 200 dg/min (preferably 1 to 100 dg/min or less); and c) an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and d) an Mw/Mn of 1.5 to 4, and e) a propylene triad tacticity, as measured by $^{13}$C NMR, of 75% or greater, where the blend has:

i) a melt flow rate of 0.5 to 200 dg/min (preferably 1 to 100 dg/min); and ii) less than 5 weight % filler, based upon the weight of the polymers and the filler; and iii) a permanent set of greater than 65%; and iv) a haze of 20% or less on a 1 mm injection molded chip; and the molded part has:

a) a thickness of 250 μm to 10 mm; and b) a notched Izod impact strength at 23° C. of 80 J/m (1.5 ft.lb/in) or more; and c) a notched Izod impact strength at 0° C. of 27 J/m (0.5 ft.lb/in) or more; and d) a 1% secant flexural modulus of 150,000 psi (1035 MPa) or lower e) an ultimate elongation where greater than 50% of 5 test specimens suffer no break through extension to 1000%; and f) a resistance to stress whitening of Hunter color ΔL of 15 or lower, measured on a 0.125 in (3.18 mm) thick injection molded pad.

In a preferred embodiment, the blend of the semi-crystalline and semi-amorphous polymers is a heterogeneous blend, preferably where the semi-crystalline polymer is the continuous phase and the semi-amorphous polymer is the discontinuous phase.

By heterogeneous blend is meant a composition having two or more morphological phases in the same state. For example a blend of two polymers where one polymer forms discrete packets dispersed in a matrix of another polymer is said to be heterogeneous in the solid state. Also heterogeneous blend is defined to include co-continuous blends where the blend components are separately visible, but it is unclear which is the continuous phase and which is the discontinuous phase. Such morphology is determined using scanning electron microscopy (SEM) or atomic force microscopy (AFM), in the event the SEM and AFM provide different data, then the SEM shall be used. By continuous phase is meant the matrix phase in a heterogeneous blend. By discontinuous phase is meant the dispersed phase in a heterogeneous blend.

By homogeneous blend is meant a composition having substantially one morphological phase in the same state. For example a blend of two polymers where one polymer is miscible with another polymer is said to be homogeneous in the solid state. Such morphology is determined using scanning electron microscopy. By miscible is meant that that the blend of two or more polymers exhibits single-phase behavior for the glass transition temperature, e.g. the Tg would exist as a single, sharp transition temperature on the DMTA trace. By contrast, two separate transition temperatures would be observed for an immiscible blend, typically corresponding to the temperatures for each of the individual components of the blend. Thus a polymer blend is miscible when there is one Tg indicated on the DMTA trace. A miscible blend is homogeneous, while an immiscible blend is heterogeneous.

BRIEF DESCRIPTION OF THE DRAWINGS

FIG. 1 is an AFM micrograph of a heterogeneous blend composition (Example 3-2). The blend comprises 20 wt % of a semi-amorphous propylene-ethylene copolymer, containing 14.5 wt % ethylene, with 80 wt % of a semi-crystalline propylene homopolymer.

FIG. 2A is a Dynamic Mechanical Thermal Analysis (DMTA) Testing result on Examples 3-1 to 3-4. The figure is a plot of DMTA tan δ versus temperature.

FIG. 2B is a Dynamic Mechanical Thermal Analysis (DMTA) Testing result on Example 4-1. The figure is a plot of DMTA tan δ versus temperature.

FIG. 3 shows two AFM Micrographs on heterogeneous blend Examples 3-4 (no clarifying agent) and 4-7 (with clarifying agent).

DETAILED DESCRIPTION

For purposes of this invention and the claims thereto, the term copolymers means any polymer comprising two or more monomers. For the purposes of this invention and the claims thereto when a polymer is referred to as comprising a monomer, the monomer present in the polymer is the polymerized form of the monomer. Likewise when catalyst components are described as comprising neutral stable forms of the components, it is well understood by one of ordinary skill in the art, that the active form of the component is the form that reacts with the monomers to produce polymers.

The new notation numbering scheme for the Periodic Table Groups is used herein as set out in CHEMICAL AND ENGINEERING NEWS, 63(5), 27 (1985).

As used herein, the term "molded article" means an article made by a molding process such as blow molding, injection molding, injection stretch molding, thermoforming, profile extrusion, and the like.

As used herein, the term "polypropylene", "propylene polymer," or "PP" refers to homopolymers, copolymers, terpolymers, and interpolymers, comprising from 50 to 100 weight % of propylene.

As used herein, the term "reactor grade" refers to polyolefin resin whose molecular weight distribution (MWD), or polydispersity, has not been substantially altered after polymerization, except for pelletizing with an antioxidant. The term particularly includes polyolefins which, after polymerization, have not been treated, or subjected to treatment, to substantially reduce viscosity or substantially reduce average molecular weight.

As used herein, "metallocene" means one or more compounds represented by the formula $Cp_mMR_nX_q$, wherein Cp is a cyclopentadienyl ring which may be substituted, or derivative thereof (such as indene or fluorene) which may be substituted; M is a Group 4, 5, or 6 transition metal, for example titanium, zirconium, hafnium, vanadium, niobium, tantalum, chromium, molybdenum and tungsten; R is a substituted or unsubstituted hydrocarbyl group or hydrocarboxy group having from one to 20 carbon atoms; X may be a halide, a hydride, an alkyl group, an alkenyl group or an arylalkyl group; and m=1-3; n=0-3; q=0-3; and the sum of m+n+q is equal to the oxidation state of the transition metal, further if m is 2 or 3 then any two Cp groups may be bound to one another through a bridging group T, which is typically a group 14 atom which may be substituted with one or two hydrocarbyl groups (a preferred example includes $(CH_3)_2$—Si), if m is 1 then the Cp group may be bound to R via a bridging group T which is typically a group 14 atom which may be substituted with one or two hydrocarbyl groups (a preferred example includes $(CH_3)_2$—Si).

Abbreviations may be used including: Me=methyl, Et=ethyl, Bu=butyl, Ph=phenyl, Cp=cyclopentadienyl, Cp*=pentamethyl cyclopentadienyl, Ind=indenyl, and Flu=fluorene.

As used herein, "support" or "support composition" refers to compounds that are particulate and porous that may optionally be calcined or contacted with a halogen. For example, a fluorided support composition can be a silicon dioxide support wherein a portion of the silica hydroxyl groups has been replaced with fluorine or fluorine containing compounds. Suitable fluorine containing compounds include, but are not limited to, inorganic fluorine containing compounds and/or organic fluorine containing compounds.

As used herein, "metallocene catalyst system" is the product of contacting components: (1) one or more metallocenes; (2) one or more activators; and (3) optionally, one or more support compositions. Preferred activators include alumoxanes (including methylalumoxane and modified-methylalumoxane), stoichiometric activators, ionic activators, non-coordinating anions and the like.

As used herein "semi-crystalline polymer" is defined to be an olefin polymer having a melting point (Tm) of 100° C. or more (as measured by DSC-second melt, described below). As used herein a "semi-amorphous polymer" is defined to be an olefin polymer having a heat of fusion of between 4 and 70 J/g (as determined by DSC, described below). Melting point (Tm), peak crystallization temperature (Tc), heat of fusion (Hf) and percent crystallinity are determined using the following procedure according to ASTM E 794-85. Differential scanning calorimetric (DSC) data is obtained using a TA Instruments model 2910 machine or a Perkin-Elmer DSC 7 machine. In the event that the TA Instruments 2910 machine and the Perkin-Elmer DSC-7 machine produce different DSC data, the data from the TA Instruments model 2910 shall be used. Samples weighing approximately 5-10 mg are sealed in aluminum sample pans. The DSC data is recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity. The percent crystallinity (X %) is calculated using the formula, X %=[area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. For the semi-crystalline polymers, having appreciable crystallinity, the melting temperature is typically measured and reported during the second heating cycle (or second melt). For the semi-amorphous polymers, having comparatively low levels of crystallinity, the melting temperature is typically measured and reported during the first heating cycle. Prior to the DSC measurement, the sample is aged (typically by holding it at ambient temperature for a period up to about 5 days) or annealed to maximize the level of crystallinity.

As used herein, molecular weight (Mn and Mw) and molecular weight distribution (MWD or Mw/Mn) are determined by gel permeation chromatography using polystyrene standards. The GPC data were taken on a Waters 150 GPC using three Shodex mixed bed AT-80M/S columns. The solvent used was 1,2,4 trichlorobenzene that contains 300 ppm of the antioxidant Santonox R. The run conditions were an operating temperature of 145 C, a nominal flow rate of 1.0 ml/min and a 300 µL injection volume. Solutions for injection were typically 1.0 to 1.5 mg/ml. The columns were calibrated by running a series of narrow molecular weight polystyrene (PS) standards and recording their retention volumes. Polypropylene (PP) molecular weight values were calculated using the "universal calibration" approach and the following Mark-Houwink coefficients:

|    | k (dL/g)              | a    |
|----|-----------------------|------|
| PS | $1.75 \times 10^{-4}$ | 0.67 |
| PP | $8.33 \times 10^{-5}$ | 0.80 |

A third order fit is used to fit the Log (MW) vs Retention volume points. The data were taken and analyzed by Waters Millenium software.

A clarifying agent is defined to be any agent that causes at least a 10%, preferably at least 15%, more preferably at least 20% reduction in haze (as measured on a 1 mm molded chip according to ASTM D 1003) as compared to the same composition without the clarifying agent. A nucleating agent is often a clarifying agent. A nucleating agent is defined to be an additive which forms nuclei in a polymer melt to promote the growth of crystals (adipic acid, benzoic acid, or metal salts of these acids, sorbitols, such as 3,4-dimethylbenzylidene sorbitol are examples of nucleating agents, as are many inorganic fillers).

Blend Components—Semi-Crystalline Polymer

In a preferred embodiment, the blends of this invention comprise from 60 to 99 weight percent of one or more semi-crystalline polymers (based upon the weight of the semi-crystalline and semi-amorphous polymers), preferably from 60 to 90 weight %, preferably from 60 to 85 weight %, preferably from 60 to 75 weight %, each semi-crystalline polymer comprising propylene and from 0 to 5 weight % alpha-olefin comonomer (based upon the weight of the polymer), preferably from 0.1 to 4 weight %, preferably from 0.25 to 3 weight %. Preferably the alpha olefin comonomer is a C2 to C10 alpha olefin, preferably selected from the group consisting of ethylene, butene, pentene, hexene, heptene, octene, nonene, and decene, preferably ethylene, butene, hexene, and octene, preferably ethylene. (For purposes of this invention when a copolymer is described as comprising propylene and one or more C2 to C10 olefins, or alpha olefins, the C2 to C10 olefins or alpha olefins do not include C3 e.g. propylene.)

Preferred semi-crystalline polymers have a melting point (Tm—second melt as measured by DSC as described above) between 100 and 170° C., preferably between 110 and 170° C., preferably between 125 and 170° C.

Preferred semi-crystalline polymers have a melt flow rate of from 0.1 to 200 dg/min, preferably 0.25 to 100 dg/min, preferably from 0.5 to 50 dg/min (ASTM 1238-D, condition L, 2.16 kg, 230° C.).

Preferred semi-crystalline polymers have an Elongation at Break of 700% or less, preferably 300 to 700 %, as measured by ASTM D 638, 2 in/min/50 mm/min on a 0.125 in (3.18 mm) thick injection molded sample.

Preferred semi-crystalline polymers have a 1° Secant Flexural Modulus of from 100,000 psi to 250,000 psi (690 to 1720 MPa), preferably from 150,000 psi to 250,000 psi (1035 to 1720 MPa) as measured by ASTM 790A (0.05 in/min/1.3 mm/min). "High-crystallinity polypropylenes," e.g. those having values above 250,000 psi (1720 MPa) can also be used.

Any propylene polymer having 0 to 5 weight % comonomer, a melting point between 100 and 170, and an MFR of 200 dg/min or less may be used in the practice of this invention. Suitable examples include polymers produced by Ziegler-Natta catalyst systems, metallocene systems, and the like. The polymers may be produced by any means including solution, slurry, gas phase, supercritical or high pressure. In a particularly preferred embodiment the propylene polymers useful herein have a molecular weight distribution (Mw/Mn) of 5 or less preferably between 1.5 and 4 preferably between 1.5 and 3. In another preferred embodiment, preferred propylene polymers useful herein include those produced by metallocene catalyst systems. In another embodiment preferred propylene polymers useful herein include those having a composition distribution breadth index (CDBI) of 60% or more, preferably 70 % or more, preferably 80% or more, preferably 90% or more. (CDBI is measured as described in WO 93/03093, with the modification that any fractions having a weight average molecular weight (Mw) below 25,000 g/mol are disregarded.) Preferred propylene polymers that can be used in the practice of this invention include those propylene polymers sold by ExxonMobil Chemical Company under the tradename ACHIEVE™. Particularly useful grades include ACHIEVE™ 3854, ACHIEVE™ 1654E1, ACHIEVE™3825, ACHIEVE™1605, available from ExxonMobil Chemical Company in Houston, Tex. Additional preferred propylene polymers useful in the practice of this invention include those propylene homopolymers, and random copolymers available from ExxonMobil Chemical Company under the grade names: PP1024E4, PP1042, PP1032, PP1044, PP1052, PP1105E1, PP3155 and PP9852E1, PP9272, PP9513, PP9544, PP9562. In some instances impact copolymers can be utilized in the practice of this invention. Several are available from ExxonMobil Chemical Company (e.g. PP7032 E2).

In another embodiment preferred semi-crystalline polymers useful herein have a melting point greater than 110° C., preferably greater than 115° C., and most preferably greater than 130° C. and a heat of fusion of greater than 60 J/g, preferably at least 70 J/g, preferably at least 80 J/g, as determined by DSC analysis described above.

The molecular weight of the semi-crystalline polymer can be between 10,000 to 5,000,000 g/mol, alternatively 50,000 to 500,000 g/mol, preferably with a polydispersity index (PDI—Mw/Mn) between 1.5 to 4, preferably 1.5 to 3.

Preferred semi-crystalline polymers may be isotactic, highly isotactic, syndiotactic, or highly syndiotactic. In one embodiment, the semi-crystalline polymer is an isotactic polypropylene. In another embodiment, the semi-crystalline polymer is a highly isotactic polypropylene. As used herein, "isotactic" is defined as having at least 10% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C-NMR. In a desirable embodiment, a polypropylene homo- or co-polymer having at least 85% isotacticity is the semi-crystalline polymer. In another embodiment, the semi-crystalline polymer has at least 90% isotacticity. As used herein, "syndiotactic" is defined as having at least 10% syndiotactic pentads, preferably at least 40%, according to analysis by $^{13}$C-NMR. As used herein, "highly syndiotactic" is defined as having at least 60% syndiotactic pentads according to analysis by $^{13}$C-NMR. In a desirable embodiment, a polypropylene homo- or co-polymer having at least 85% syndiotacticity is the semi-crystalline polymer. In another embodiment, a propylene homo- or co-polymer having at least 90% syndiotacticity is the semi-crystalline polymer.

Blend Components—Semi-Amorphous Polymer

In a preferred embodiment, blends of this invention comprise from 1 to 40 weight percent of one or more semi-amorphous polymers (based upon the weight of the semi-crystalline and semi-amorphous polymers), preferably from greater than 10 to 40 weight %, preferably from 15 to 40 weight %, preferably from 25 to 40 weight %. In some embodiments, the semi-amorphous polymers comprise propylene and from 10 to 25 weight % of one or more C2 to C10 alpha-olefin comonomers, preferably from 10 to 20 weight %, preferably from 12 to 20 weight %, based upon the weight of the copolymer. Preferably the alpha olefin comonomer is a C2 to C10 alpha olefin selected from the group consisting of ethylene, butene, pentene, hexene, heptene, octene, nonene, and decene, preferably ethylene, butene, hexene, and octene, preferably ethylene.

The ethylene content of the semi-amorphous polymers can be measured as follows. A thin homogeneous film is pressed at a temperature of about 150° C. or greater, then mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585−111.987X+30.045 X$^2$, wherein X is the ratio of the peak height at 1155 cm$^{-1}$ and peak height at either 722 cm$^{-1}$ or 732 cm$^{-1}$, whichever is higher.

Preferred semi-amorphous polymers having from 10 to 25 weight % comonomers useful in this invention preferably have a percent crystallinity of 2.5 to 25%, preferably from 5 to 23%, preferably from 5 to 20%. Percent crystallinity is determined according to the DSC procedure described above.

Preferred semi-amorphous polymers useful in this invention preferably have a melt flow rate of 0.1 to 200 dg/min preferably 0.1 to 100 dg/min, preferably 0.5 to 50 (as measured by ASTM D-1238, condition L, 2.16 kg and 230° C.).

Preferred semi-amorphous polymers useful in this invention preferably have a DSC melting point (Tm) of 105° C. or less, preferably 90° C. or less, preferably between 25 and 90° C., preferably between 30 and 80° C., preferably between 35 and 75° C., as measured by the DSC procedure described above.

Preferred semi-amorphous polymers useful in this invention preferably have an intermolecular composition distribution of 75% or more, preferably 80% or more, preferably 85% or more, preferably 90% or more by weight of the polymer isolated as one or two adjacent, soluble fractions with the balance of the polymer in immediately preceding or succeeding fractions; and wherein each of these fractions has a weight % comonomer content with a difference of no greater than 20 wt % (relative), preferably 10% (relative), of the average weight % comonomer of the copolymer. The fractions are obtained at temperature increases of approximately 8C between stages. The intermolecular composition distribution of the copolymer is determined by thermal fractionation in hexane as follows: about 30 grams of the semi-amorphous polymer is cut into small cubes of about ⅛ inch (0.32 cm) on the side and is then introduced into a thick walled glass bottle closed with screw cap along with 50 mg of Irganox1076, an antioxidant commercially available from Ciba-Geigy Corporation. Then, 425 ml of hexane (a principal mixture of normal and iso isomers) is added to the contents of the bottle and the sealed bottle is maintained at about 23° C. for 24 hours. At the end of this period, the solution is decanted and the residue is treated with additional hexane for an additional 24 hours at 23° C. At the end of this period, the two hexane solutions are combined and evaporated to yield a residue of the polymer soluble at 23° C. To the residue is added sufficient hexane to bring the volume to 425 ml and the bottle is maintained at about 31° C. for 24 hours in a covered circulating water bath. The soluble polymer is decanted and the additional amount of hexane is added for another 24 hours at about 31° C. prior to decanting. In this manner, fractions of the semi-amorphous polymer soluble at 40° C., 48° C., 55° C., and 62° C. are obtained at temperature increases of approximately 8° C. between stages. The soluble polymers are dried, weighed and analyzed for composition, as wt % ethylene content. To produce a copolymer having the desired narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

Preferred semi-amorphous polymers useful in this invention preferably have a molecular weight distribution (Mw/Mn) of Mw/Mn of less than 5, preferably between 1.5 and 4, preferably between 1.5 and 3.

In another embodiment polymers that are useful in this invention as semi-amorphous polymers include homopolymers and random copolymers of propylene having a heat of fusion as determined by Differential Scanning Calorimetry (DSC) of less than 70 J/g, an MFR of 50 dg/min or less, and contain stereoregular propylene crystallinity preferably isotactic stereoregular propylene crystallinity. In another embodiment the polymer is a random copolymer of propylene and at least one comonomer selected from ethylene, $C_4$-$C_{12}$ α-olefins, and combinations thereof. Preferably the random copolymers of propylene comprises from 10 wt % to 25 wt % polymerized ethylene units, based on the total weight of the polymer; has a narrow intermolecular composition distribution (e.g. 75% or more by thermal fractionation); has a melting point (Tm) of from 25° C. to 120° C., or from 35° C. to 80° C.; has a heat of fusion within the range having an upper limit of 70 J/g or 25 J/g and a lower limit of 1 J/g or 3 J/g; has a molecular weight distribution Mw/Mn of from 1.8 to 4.5; and has a melt flow rate of less than 50 dg/min, (as measured at 230° C., and 2.16 kg, ASTM D-1238).

A particularly preferred polymer useful in the present invention as a semi-amorphous polymer is a polymer with a moderate level of crystallinity due to stereoregular propylene sequences. The polymer can be: (A) a propylene homopolymer in which the crystallinity is disrupted in some manner such as by regio-inversions; (B) a random propylene copolymer in which the propylene crystallinity is disrupted at least in part by comonomers; or (C) a combination of (A) and (B).

In one embodiment, the useful polymers described above further include a non-conjugated diene monomer to aid in later chemical modification of the blend composition (such as crosslinking). The amount of diene present in the polymer is preferably less than 10% by weight, and more preferably less than 5% by weight. The diene may be any non-conjugated diene which is commonly used in ethylene propylene copolymers including, but not limited to, ethylidene norbornene, vinyl norbornene, and dicyclopentadiene.

In one embodiment, the semi-amorphous polymer is a random propylene copolymer having a narrow composition distribution. In another embodiment, the semi-amorphous polymer is a random propylene copolymer having a narrow composition distribution and a melting point of from 25° C. to 120° C., preferably 25° C. to 90° C. The copolymer is described as random because for a polymer comprising propylene, comonomer, and optionally diene, the number and distribution of comonomer residues is consistent with the random statistical polymerization of the monomers. In stereoblock structures, the number of block monomer residues of any one kind adjacent to one another is greater than predicted from a statistical distribution in random copolymers with a similar composition. Historical ethylene-propylene copolymers with stereoblock structure have a distribution of ethylene residues consistent with these blocky structures rather than a random statistical distribution of the monomer residues in the polymer. The intermolecular composition distribution (i.e., randomness) of the copolymer may be determined by $^{13}C$ NMR, which locates the comonomer residues in relation to the neighboring propylene residues. The intermolecular composition distribution of the copolymer is determined by thermal fractionation in hexane as previously described.

In another embodiment, semi-amorphous polymers useful herein have a heat of fusion of 70 J/g or less, as determined by DSC described above, preferably from 1 to 65 J/g, preferably from 4 to 50 J/g, preferably from 4 to 45 J/g.

In another embodiment, semi-amorphous polymers useful herein have a weight average molecular weight of from 20,000 to 1,000,000, preferably from 50,000 to 500,000, preferably from 125,000 to 400,000 g/mol.

Preferred semi-amorphous polymers used in embodiments of the present invention have a propylene tacticity index (m/r) ranging from a lower limit of 4 or 6 to an upper limit of about 8, 10, or 12. The propylene tacticity index, expressed herein as "m/r", is determined by $^{13}C$ nuclear magnetic resonance (NMR). The propylene tacticity index m/r is calculated as defined in H. N. Cheng, *Macromolecules*, 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 an atactic material, and an m/r ratio of greater than 1.0 an isotactic material. An isotactic material theoretically may have a ratio approaching infinity, and many by-product atactic polymers have sufficient isotactic content to result in ratios of greater than 50.

In a preferred embodiment, the preferred semi-amorphous polymers have isotactic stereoregular propylene crystallinity. The term "stereoregular" as used herein means that the predominant number, i.e. greater than 80%, of the propylene residues in the polypropylene exclusive of any other monomer such as ethylene, has the same 1,2 insertion and the stereochemical orientation of the pendant methyl groups is the same, either meso or racemic.

Preferred semi-amorphous polymers useful in this invention have a triad tacticity of three propylene units, as measured by $^{13}C$ NMR, of 75% or greater, 80% or greater, 82% or greater, 85% or greater, or 90% or greater. The triad tacticity of a polymer is the relative tacticity of a sequence of three adjacent propylene units, a chain consisting of head to tail bonds, expressed as a binary combination of m and r sequences. It is usually expressed for semi-amorphous copolymers of the present invention as the ratio of the number of units of the specified tacticity to all of the propylene triads in the copolymer. The triad tacticity (mm fraction) of a propylene copolymer can be determined from a $^{13}C$ NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

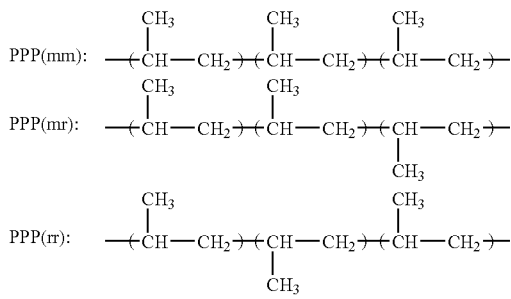

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP (mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

Preferred polymers useful as semi-amorphous copolymers in this invention are also those polymers described in detail as the "Second Polymer Component (SPC)" in WO 00/69963, WO 00/01766, WO 99/07788, WO 02/083753, and described in further detail as the "Propylene Olefin Copolymer" in WO 00/01745, all of which are fully incorporated by reference herein.

Preferred semi-amorphous copolymers may be produced in a solution process using a metallocene catalyst as follows. In a preferred embodiment, a continuous solution polymerization process is used to produce copolymers of propylene and from 10 to 25 weight % ethylene preferably utilizing a metallocene catalyst, namely, 1,1'-bis(4-triethylsilylphenyl) methylene-(cyclopentadienyl)(2,7-di-tertiary-butyl-9-fluorenyl)hafnium dimethyl with dimethylaniliniumtetrakis-(pentafluorophenyl) borate as an activator. An organoaluminum compound, namely, tri-n-octylaluminum, may be added as a scavenger to the monomer feedstreams prior to introduction into the polymerization process. For preferred polymers, dimethylsilyl bis(indenyl)hafnium dimethyl is used in combination with dimethylaniliniumtetrakis (pentafluorophenyl) borate. In other embodiments, dimethylsilyl bis(2-methyl-5-phenylindenyl)zirconium di alkyl (such as methyl) and or dimethylsilyl bis(2-methylindenyl)zirconium di alkyl (such as methyl) is used with an activator (dimethylaniliniumtetrakis(pentafluorophenyl)borate and or triaryl carbenium(pentafluorophenyl) borate). Preferably the solution polymerization is conducted in a single, or optionally in two, continuous stirred tank reactors connected in series with hexane used as the solvent. In addition, toluene may be added to increase the solubility of the co-catalyst. The feed is transferred to the first reactor at a reaction temperature between about 50° C. to about 220° C. Hydrogen gas may also be added to the reactors as a further molecular weight regulator. If desired, polymer product is then transferred to a second reactor, which is operated at a temperature between about 50° C. to 200° C. Additional monomers, solvent, metallocene catalyst, and activators can be fed to the second reactor.

Preferred semi-amorphous polymers may also be produced by the continuous solution polymerization process described in WO 02/34795, advantageously in a single reactor and separated by liquid phase separation from the alkane solvent. Preferred semi-amorphous polymers may also be produced by the polymerization process described at page 6 lines 24-57 of EP 1 003 814 B1.

Further detailed instructions on how to make such preferred semi-amorphous polymers can be found in WO 02/083754.

Preferred semi-amorphous polymers useful herein are made using a metallocene catalyst system.

Preferred semi-amorphous polymers include VM™1000, VM™2000, and VM™3000 available from ExxonMobil Chemical Company in Houston, Tex.

Blend Properties

In a preferred embodiment, the blend described herein is heterogeneous, characterized by a fine dispersion of the discontinuous phase uniformly distributed in the matrix. The dimensions of the discontinuous phase in an article, depend on the product composition and on the fabricating mode used to prepare the article. For example, injection molding will introduce orientation along the flow direction causing some elongation of the dispersed phase particles. This can be observed in FIG. 1, which is an AFM micrograph of a heterogeneous blend composition (Example 3-2). The blend comprises 20 wt % of a semi-amorphous propylene-ethylene copolymer, containing 14.5 wt % ethylene, with 80 wt % of a semi-crystalline propylene homopolymer. In the figure, the flow direction is vertical. The dispersed phase (semi-amorphous propylene-ethylene copolymer) shows up dark in the micrograph, while the matrix (polypropylene) shows up light. Despite the orientation effect along the flow direction, FIG. 1 shows dispersed phase particles with the large dimension generally no greater than 1 µm (note that the field of view in FIG. 1 is 5 µm×5 µm). It is theorized that this feature of a fine dispersion contributes to achieving good molded part clarity.

In a preferred embodiment, the blend of the semi-crystalline and semi-amorphous polymers is a heterogeneous blend, preferably where the semi-crystalline polymer is the continuous phase, and the semi-amorphous polymer is the discontinuous phase.

In another embodiment, depending on the composition, the blend could be heterogeneous with two phases, but the two phases could be co-continuous. In this case, it is not possible to definitively attribute one component to the matrix and the other to the dispersed phase, rather, both components share the matrix.

The blends of the present invention can be prepared by any procedure that causes the intimate admixture of the components. This includes reactor blends, where the semi-crystalline polypropylene component is polymerized in one reactor (or one stage of one reactor) and the polymerized product is transferred to a different reactor or different stage of the same reactor, where polymerization of the semi-amorphous polymer occurs. The final blend product comprises an intimate mix of the two polymer components. Alternately, the blends can be prepared by post-reactor mixing of the semi-crystalline and semi-amorphous polymer components. For example, they may be blended in a tumbler, static mixer, batch mixer, extruder, or a combination thereof. The mixing step may take place as part of a processing method used to fabricate articles, such as in the extruder on an injection molding, machining or fiber line. Likewise, the components can be combined by melt pressing the components together on a Carver press to a thickness of 0.5 millimeter (20 mils) and a temperature of 180° C., rolling up the resulting slab, folding the ends together, and repeating the pressing, rolling, and folding operation 10 times. Internal mixers are particularly useful for solution or melt blending. Blending at a temperature of 180° C. to 240° C. in a Brabender Plastograph for 1 to 20 minutes has been found satisfactory. Still another method that may be used for admixing the components involves blending the polymers in a Banbury internal mixer above the flux temperature of all of the components, e.g., 180° C. for 5 minutes. A complete mixture of the polymeric components is indicated by the uniformity of the morphology of the dispersion of the semicrystalline polymer(s) and the semi-amorphous polymer(s). Continuous mixing may also be used. These processes are well known in the art and include single and twin screw mixing extruders, static mixers for mixing molten polymer streams of low viscosity, impingement mixers, as well as other machines and processes, designed to disperse the semi-crystalline polymer component and the semi-amorphous polymer component in intimate contact.

In a preferred embodiment, the blend has dispersions of semi-amorphous polymer less than 4 μm in size in a continuous phase of semi-crystalline polymer, preferably the dispersions (also called dispersed particles) are 3 μm or less, preferably 2 μm or less, preferably 1 μm or less. (By dispersions less than 4 μm in size is meant that the average dispersion size is 4 μm or less.)

The blends of the present invention preferably have a permanent tension set of 65% or more, preferably 85% or more, preferably 100% or more, preferably 125% or more, preferably 150% or more.

Permanent tension set is measured according to the following procedure. Hysteresis testing is done on molded samples having the required dumbbell geometry (ASTM designation type I bars for polypropylene), using the following test procedure. The deformable zone (2.54 cm long section) of the sample is stretched to 200% of its original length at a deformation rate of 20 in/min (51 cm/min) in an Instron (The Instron Corporation, Canton, Mass.) testing machine. The sample is then allowed to relax while the machine retracts and comes back to the point where the stress is zero. The machine resets the new zero elongation point at this position. With the specimen still within the grips, the second cycle is then initiated for another 200% extension. Again, the machine is allowed to come back to the point where the stress is zero on the retraction cycle. The set for each cycle is determined with reference to their respective zero elongation points. Two specimens are tested for each sample. The average of the set values over the two cycles is taken as the permanent tension set.

The blends of the present invention preferably have a haze of 20% or less, preferably 15% or less, preferably 12% or less, preferably 10% or less, as measured by ASTM D 1003 on a 1 mm thick injection molded haze chip sample provided that the blend in question is combined with 2500 ppm of bis (3,4 dimethylbenzylidene)sorbitol (also called DMDBS and is available as (Millad 3988 from Milliken Chemicals) prior to being molded into the 1 mm chip. While the inventive blends are combined with a clarifying agent for haze testing, the final molded articles of the invention may or may not contain clarifying agent. Molded article haze is also measured according to ASTM-D 1003.

In another embodiment, the blends of the present invention preferably have a melt flow rate (ASTM D-1238 Condition L; 230° C., 2.16 kg) of 0.1 to 100 dg/min, preferably 0.5 to 50 dg/min, preferably 0.5 to 30 dg/min. In another embodiment, the blends of the present invention have a melt flow rate of 5 to 200 dg/min, preferably from 10 to 100 dg/min, preferably from 10 to 85 dg/min, preferably from 10 to 80 dg/min.

In another embodiment, the blends have less than 5 wt % filler, based on the weight of the polymers and the filler.

In certain embodiments, the blends of the present invention may also comprise a third polymer component. The third polymer component may be added to the semi-crystalline polymer, the semi-amorphous polymer or the blend by methods well known in the art. In these embodiments, the third polymer component (TPC) comprises low density polyethylene (density 0.915 to less than 0.935 $g/cm^3$), linear low density polyethylene, ultra low density polyethylene (density 0.85 to less than 0.90 $g/cm^3$), very low density polyethylene (density 0.90 to less than 0.915 $g/cm^3$), medium density polyethylene (density 0.935 to less than 0.945 $g/cm^3$), high density polyethylene (density 0.945 to 0.98 $g/cm^3$), or combinations thereof. For example, polyethylene produced using a metallocene catalyst system (mPEs), i.e., ethylene homopolymers or copolymers may be employed. In a particular example, mPE homopolymers and copolymer are those produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Illustrative but not exclusive commercially products are available from ExxonMobil Chemical Company, Houston, Tex., under the tradenames EXCEED™ and EXACT™ among others well known in the industry. Blends where the third component is a propylene polymer or copolymer, an EP or EPDM copolymer rubber, another polyolefin (e.g. EVA ethylene vinlyacetate) are also envisioned.

The blends of this invention may also comprise additives and other ingredients. For example the blends of this invention may comprise slip agents or mold-release agents to facilitate moldability, preferably present at 50 ppm to 10 weight %, preferably 50 to 5000 ppm. Preferably the slip additives are present at 0.001 to 1 wt % (10 to 10,000 ppm), more preferably 0.01 to 0.5 wt % (100 to 5000 ppm), more preferably 0.1 to 0.3 wt % (1000 to 3000 ppm), based upon the weight of the composition. Desirable slip additives include but are not limited to saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethy-lerucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; stearates such as zinc stearate and mixtures thereof. Preferred slip additives are unsaturated fatty acid amides, which are available from Crompton (Kekamide™ grades) and Croda Universal (Crodamide™ grades). Particularly preferred are the erucamide and oleamide versions of unsaturated fatty acid amides. Preferred slip agents include amides having the chemical structure $CH_3(CH_2)_7CH=CH(CH_2)_xCONH_2$ where x is 5 to 15. Particularly preferred amides include: 1) Erucamide $CH_3(CH_2)_7CH=CH(CH_2)_{11}CONH_2$ which may also be referred to as cis-13-docosenoamide (Erucamide is commercially available from Akzo Nobel Amides Co. Ltd. under the trade name ARMOSLIP E); 2) Oleylamide $CH_3(CH_2)_7CH=CH(CH_2)_8CONH_2$ ; and 3) Oleamide which may also be preferred to as N-9-octadecenyl-hexadecanamide) $CH_3(CH_2)_7CH=CH(CH_2)_7CONH_2$. In another embodiment, stearamide is also useful in this invention. Other preferred slip additives include those described in WO 2004/005601A1.

The blends of this invention may also comprise clarifying agent. Preferably the clarifying agent is present at from 10 ppm to 10 weight %, more preferably 25 ppm to 5 weight %, preferably 50 ppm to 4000 ppm, based on total polymer in the blend composition. Preferred clarifying agents include organophosphates, phosphate esters, sodium benzoate, talc, sorbitol, adipic acid, benzoic acid, (or metal salts of these acids), inorganic fillers, and the like. Preferred clarifying agents preferably comprise 50 to 4000 ppm of sorbitol-based agents, aluminum salt based agents, sodium salt based agents. Preferred clarifying agents include nucleating agents such as: Hyperform (e.g. HPN-68) and Millad additives (e.g. Millad 3988-3,4-dimethylbenzylidene sorbitol, dibenzylidene sorbitol) from Milliken Chemicals, Spartanburg, S.C., organophosphates like NA-11 and NA-21 from Amfine Chemicals, Allendale, N.J. Also, other nucleating agents may also be employed such as Ziegler-Natta olefin product or other highly crystalline polymers. Particularly preferred clarifying agents include disodium[2.2.1]heptane bicyclodicarboxylate, bis (3,4 dimethylbenzylidene)sorbitol, sodium 2,2'-methylene-bis(4,6-di-tert-butylphenyl)phosphate, (p-chloro, p'methyl) dibenzylidene sorbitol, bis(p-ethylbenzylidene)sorbitol, 1,2,3,4-dibenzylidene sorbitol, 1,2,3,4-di-para-methylbenzylidene sorbitol, and or aluminum 2,2'-methylene-bis(4,6-di-tert-butylphenyl) phosphate.

Further, a variety of additives may be incorporated into the embodiments described above used to make the blends and molded parts for various purposes. Such additives include, for example, stabilizers, antioxidants, fillers, colorants, and antiblock agents. Primary and secondary antioxidants include, for example, hindered phenols, hindered amines, and phosphites. Also, other nucleating agents may also be employed such as Ziegler-Natta olefin product or other highly crystalline polymer. Antiblock agents include amorphous silicas, talc, zin stearate among others. Additives such as dispersing agents, for example, Acrowax C, can also be included. Catalyst deactivators are also commonly used, for example, calcium stearate, hydrotalcite, and calcium oxide, and/or other acid neutralizers known in the art.

Other additives include, for example, fire/flame retardants, blowing agents, plasticizers, vulcanizing or curative agents, vulcanizing or curative accelerators, cure retarders, processing aids, tackifying resins, and the like. The aforementioned additives may also include fillers and/or reinforcing materials, either added independently or incorporated into an additive. Examples include carbon black, clay, talc, calcium carbonate, mica, silica, silicate, combinations thereof, and the like. Other additives which may be employed to enhance properties include lubricants and UV stabilizers. The lists described herein are not intended to be inclusive of all types of additives which may be employed with the present invention. Upon reading this disclosure, those of skilled in the art will appreciate other additives may be employed to enhance properties. As is understood by the skilled in the art, the blends of the present invention may be modified to adjust the characteristics of the blends as desired.

Process oils can also be optimally added to the embodiments described above. The blend may include process oil in the range of from 1 to 50, alternatively in the range of from 2 to 20 parts by weight of process oil per hundred parts of total polymer components. The addition of process oil in moderate amounts lowers the viscosity and stiffness of the blend while improving the properties of the blend at temperatures near and below 0° C. It is believed that these benefits arise by the lowering of the Tg of the blend. Additional benefits of adding process oil to the blend include improved processibilty and a better balance of elastic and tensile strength. The process oils typically consist of (a) hydrocarbons consisting essentially of carbon and hydrogen with traces of hetero atoms such as oxygen or (b) essentially of carbon, hydrogen and at least one hetero atom such as dioctyl phthalate, ethers and polyethers. Preferred process oils have a high boiling point to be substantially involatile at 200° C. Such process oils are commonly available either as neat solids or liquids or as physically absorbed mixtures of these materials on an inert support (e.g. clays, silica) to form a free flowing powder. Other useful process oils include a mixture of a large number of chemical compounds which may consist of linear, acyclic but branched, cyclic and aromatic carbonaceous structures. Another family of useful process oils are certain low to medium molecular weight (Molecular weight $(M_n)<10,000$) organic esters and alkyl ether esters. Examples of process oils are Sunpar™ 150 and 220 from The Sun Manufacturing Company of Marcus Hook, Pa., USA and Hyprene™ V750 and Hyprene™ V1200 from Ergon, in Jackson, Miss. and IRM 903 from Calumet Lubricants Company in Princeton, La. It is also anticipated that combinations of process oils each of which is described above may be used in the practice of the invention. In certain embodiments, it is important that in the selection the process oil be compatible or miscible with the blend composition in the melt to form a homogenous one phase blend, although two phase blends and multi-phase blends are also contemplated. The addition of the process oils to the blend or blend polymer components maybe made by any of the conventional means known to the art.

The addition of certain process oils to lower the glass transition temperature of the blends of isotactic polypropylene and ethylene propylene diene rubber has been described in the art by Ellul in U.S. Pat. Nos. 5,290,886 and 5,397,832. These procedures are easily applicable to the current invention.

In certain embodiments the components as well as the blends may include various amounts of plasticizer(s). In one embodiment, the plasticizer comprises $C_6$ to $C_{200}$ paraffins, and $C_8$ to $C_{100}$ paraffins in another embodiment. In another embodiment, the plasticizer consists essentially of $C_6$ to $C_{200}$ paraffins, and consists essentially of $C_8$ to $C_{100}$ paraffins in another embodiment. For purposes of the present invention and description herein, the term "paraffin" includes all isomers such as n-paraffins, branched paraffins, isoparaffins, and may include cyclic aliphatic species, and blends thereof, and may be derived synthetically by means known in the art, or from refined crude oil. Suitable plasticizers also include "isoparaffins", "polyalphaolefins" (PAOs) and "polybutenes" (a subgroup of PAOs). These three classes of compounds can be described as paraffins which can include branched, cyclic, and normal structures, and blends thereof. They can be described as comprising $C_6$ to $C_{200}$ paraffins in one embodiment, and $C_8$ to $C_{100}$ paraffins in another embodiment. Preferred plasticizers include those described in WO 2004/014998 (which is incorporated by reference herein), particularly those plasticizers described at page 9, line 31 to page 26, line 19. Preferred poly-alpha-olefins (PAO's) useful in this invention include those described in WO 2004/014998, particularly those described at page 17, line 19 to page 19, line 25. Likewise Group III Basestocks may be used as plasticizers herein. Preferred Group III Basestocks include those described in WO 2004/014998, particularly those Group III Basestocks which are severely hydrotreated mineral oils having a saturates levels of 90% or more, preferably 92% or more, preferably 94% or more, preferably 95% or more, and sulfur contents less than 0.03%, preferably between 0.001 and 0.01%, and viscosity index (VI) is in excess of 120, preferably 130 or more. Preferably the Group III hydrocarbon base stock has a kinematic viscosity at 100° C. of 3 to 100, preferably 4 to 100 cSt, preferably 6 to 50 cSt, preferably 8 to 20; and/or a number average molecular weight of 300 to 5,000, preferably 400 to 2,000, more preferably 500 to 1,000; and/or a carbon number of 20 to 400, preferably 25 to 400, preferably 35 to 150, more preferably 40 to 100. The plasticizer may be present in the blends of the invention from 0.1 wt % to 60 wt % in one embodiment (based upon the weight of the blend, respectively), and from 0.5 wt % to 40 wt % in another embodiment, and from 1 wt % to 20 wt % in yet another embodiment, and from 2 wt % to 10 wt % in yet another embodiment, wherein a desirable range may comprise any upper wt % limit with any lower wt % limit described herein.

Molded Articles

In a preferred embodiment the molded article has a notched Izod impact strength (as determined by ASTM D-256) at 23° C. of 80 J/m or more (1.5 ft.lb/in or more), preferably 107 J/m or more (2 ft.lb/in), preferably 160 J/m or more (3.0 ft.lb/in or more), preferably 320 J/m or more (6.0 ft.lb/in or more), more preferably no specimen breaks during testing. Notched Izod impact strength was conducted on a TMI Izod Impact tester. The notch was oriented such that the impact occurred on the notched side of the specimen. In another preferred embodiment the molded article has a notched Izod impact strength (as determined by ASTM D-256) at 0° C. of 27 J/m or more (0.5 ft.lb/in or more), preferably 40 J/m or more (0.75 ft.lb/in or more), preferably 53 J/m or more (1.0 ft.lb/in or more), preferably 107 J/m or more (2.0 ft.lb/in or more), preferably 160 J/m or more (3.0 ft.lb/in or more), preferably 320 J/m or more (6 ft.lb/in or more), more preferably no specimen breaks during testing.

In another preferred embodiment the molded article has a Gardner impact strength (as determined by ASTM D-5420 on 3.18 mm (0.125 in) thick injection molded disks) at 23° C. of 11.3 J or more (100 in.lb or more), preferably from 11.3 J to 22.6 J (100 in.lb to 200 in.lb), preferably greater than 22.6 J (200 in.lb), preferably greater than 26 J (230 in.lb) and with all failures being in a ductile mode. In a ductile failure mode the specimen deforms plastically before fracturing. The specimen is in one piece after the deformation and the deformed material exhibits plastic flow.

In another preferred embodiment the molded article has a Gardner impact strength (as determined by ASTM D-5420 on 3.18 mm (0.125 in) thick injection molded disks) at 0° C. of 5.6 J or more (50 in.lb or more), preferably 11.3 J or more (100 in.lb or more), preferably from 11.3 J to 22.6 J (100 in.lb to 200 in.lb), preferably greater than 22.6 J (200 in.lb), preferably greater than 26 J (230 in.lb) and with all failures being in a ductile mode.

In another preferred embodiment the molded article has an ultimate tensile strength (as determined by ASTM D 638 on 3.18 mm (0.125 in) thick injection molded bars) at 23° C., where 50% of 5 test specimens suffer no break through extension to 1000%, preferably all the test specimens suffer no break through 1000% elongation.

In another preferred embodiment, the molded article has an ultimate elongation (as measured by ASTM D 638) at 23° C., where 50% or more of five test specimens suffer no break through 1000% extension, preferably all the test specimens suffer no break through 1000% elongation.

In another embodiment, the molded article of the present invention has an instrumented impact strength at 23° C. of 10 J or more (7.5 ft.lb or more), preferably 20 J or more (15 ft.lb or more), preferably 30 J or more (22 ft.lb or more) and preferably where 50% or more of 5 test specimens fail in a ductile failure mode, preferably the molded article of the present invention has an instrumented impact strength at 23° C. of greater than 22 J (16 ft.lb) and all the specimens have fail in ductile mode. Instrumented impact testing was conducted on Dynatup Model 8250 (General Research Corporation, Instruments Divn, Santa Barbara, Calif.), with reference to ASTM-3763. The drop weight used for all the tests was 25 lb (11.4 kg), striking the sample at a speed of 15 mph.

In another embodiment, the molded article of the present invention has an instrumented impact strength at 0° C. of 5 J or more (3.7 ft.lb or more), preferably 10 J or more (7.5 ft.lb or more), preferably 20 J or more (15 ft.lb or more), preferably 30 J (22 ft.lb) or more and preferably 50% or more of 5 test specimens have fail in a ductile mode, preferably the molded article of the present invention has an instrumented impact strength at 0° C. of greater than 30 J (22 ft.lb) and all the specimens fail in ductile mode. As before, the drop weight used for all the tests was 25 lb (11.4 kg), striking the sample at a speed of 15 mph.

In another preferred embodiment the molded article has a 1% secant flexural modulus (as determined by ASTM D-790A) at 23° C. of below 1035 MPa (150,000 psi), preferably below 863 MPa (125,000 psi), preferably below 690 MPa (100,000 psi), preferably below 414 MPa (60,000 psi), more preferably below 380 MPa (55,000 psi).

Preferred molded articles comprising the blends of this invention preferably have a 1% Secant flexural modulus of 150,000 psi to 50,000 psi (345 to 1035 MPa), a Gardner Impact Strength at 0° C. of 100 in.lb or more (11.3 J or more) and a haze value (on 1 mm thick injection molded haze chip) less than 20%.

In another embodiment, the molded articles of the present invention show surprisingly good blush resistance (ie. very low to no stress-whitening). Stress-whitening, or blushing, in heterogeneous propylene copolymers is caused by the formation of voids or crazes during the deforming of a specimen, upon application of stress. Light is diffracted from the crazes and voids giving rise to the whitening, which presents an undesirable appearance. The detailed test procedure to quantify the amount of stress whitening is discussed below. In essence, a molded part is impacted using a falling-weight impact tester. The impact of the tup weight induces stress-whitening, if the sample is susceptible. Color readings (Hunter color "L"; a measure of the black-white spectrum) are taken on the molded specimen, at the impact area and outside the impact area. The degree of stress whitening is judged as the difference between the Hunter "L" color readings of the two measurements. In other words ΔL is determined, where ΔL is defined as Hunter "L" value of impact area minus Hunter "L" value of non-impact area. In one embodiment, the heterogeneous blends of the present invention show ΔL less than 15, preferably less than 10, preferably less than 5, preferably less than zero. In another embodiment, the blends of the present invention show negative ΔL values (ie. Hunter "L" value for impact area is less than Hunter "L" value for non-impact area).

The molded article may vary in thickness depending on the intended application, however parts of a thickness greater than 254 μm (0.010 inches) up to 5 cm are usually suitable, preferably the molded article has a thickness of 750 μm to 1 cm, preferably 1200 μm to 5 mm, preferably 2500 μm to 3 mm. Molded articles intended for packaging are usually from 254 μm to 1 cm thick.

Additives such as mold release agents, slip, antiblock, antioxidants, pigments, fillers, processing aids, UV stabilizers, neutralizers, lubricants, surfactants and/or nucleating agents may also be present in one or more than one layer in the molded articles. Examples of useful additives include silicon dioxide, titanium dioxide, polydimethylsiloxane, talc, dyes, wax, calcium stearate, zinc stearate, carbon black, low molecular weight resins and glass beads.

The molded articles described herein may also comprise from 5 to 60 weight %, based upon the weight of the polymer and the resin, of a hydrocarbon resin. The resin preferably has a softening point above 100° C., even more preferably from 130 to 180° C.

The blends describe herein may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. An embodiment of a thermoforming sequence is described, however this should not be construed as limiting the thermoforming methods useful with the compositions of this invention. First, an extrudate film or sheet of the composition of this invention (and any other layers or materials) is placed on a shuttle rack to hold it during heating. The shuttle rack indexes into the oven which preheats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer such as polypropylene, fast plug speeds generally provide the best material distribution in the part.

The shaped laminate is then cooled in the mold. Sufficient cooling to maintain a mold temperature of 30° C. to 65° C. is desirable. The part is below 90° C. to 100° C. before ejection in one embodiment. For the good behavior in thermoforming, the lowest melt flow rate polymers are desirable. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C.-235° C., the feed blocks are from 90° C.-250° C., and the water cooling tank temperatures are from 10° C.-40° C.

One embodiment of an injection molding process is described as follows. The shaped laminate is placed into the injection molding tool. The mold is closed and the substrate material is injected into the mold. The substrate material has a melt temperature between 200° C. and 300° C. in one embodiment, and from 215° C. and 250° C. and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer into a mold that shapes and solidifies the molten polymer into desirable geometry and thickness of molded articles. Sheet may be made either by extruding a substantially flat profile from a die, onto a chill roll, or alternatively by calendering. Sheet will generally be considered to have a thickness of from 10 mils to 100 mils (254 µm to 2540 µm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 µm to 0.5 cm. The pipe will generally be in the range of from 2.54 cm to 254 cm in outside diameter, and have a wall thickness of in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the forming tool temperature, typically a male tool, between 10° C. and 71° C. The final thickness of the cooled (room temperature), shaped laminate is from 10 µm to 6000 µm in one embodiment, from 200 µm to 6000 µm in another embodiment, and from 250 µm to 3000 µm in yet another embodiment, and from 500 µm to 1550 µm in yet another embodiment, a desirable range being any combination of any upper thickness limit with any lower thickness limit.

In an embodiment of the injection molding process, wherein a substrate material is injection molded into a tool including the shaped laminate, the melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures. In one embodiment of this process, compositions of this invention are extruded through a multi-layer head, followed by placement of the uncooled laminate into a parison in the mold. The mold, with either male or female patterns inside, is then closed and air is blown into the mold to form the part.

It will be understood by those skilled in the art that the steps outlined above may be varied, depending upon the desired result. For example, the extruded sheet of the compositions of this invention may be directly thermoformed or blow molded without cooling, thus skipping a cooling step. Other parameters may be varied as well in order to achieve a finished composite article having desirable features.

Preferred articles made using the blends of this invention include cookware, storageware, toys, medical devices, medical containers, healthcare items, sheets, crates, containers, bottles, packaging, wire and cable jacketing, pipes, sporting equipment, chair mats, tubing, profiles, instrumentation sample holders and sample windows, automotive, boat and water craft components, and other such articles. In particular, the compositions are suitable for automotive components such as trim parts, parts for dashboards and instrument panels, mirror housing, body panel, protective side molding, and other interior and external components associated with automobiles, trucks, boats, and other vehicles.

In another embodiment, this invention relates to:
1. A molded article comprising a heterogeneous blend comprising:
  1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 200 dg/min or less; and
  2) from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and/or C4 to C10 alpha-olefin comonomers, said semi-amorphous polymers each having:
    a) a heat of fusion of 4 to 70 J/g; and
    b) a melt flow rate of 0.1 to 200 dg/min; and
    c) an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
    d) an Mw/Mn of 1.5 to 4, and
    e) a propylene triad tacticity, as measured by $^{13}$C NMR, of 75% or greater, where the blend has:
  i) a melt flow rate of 0.5 to 200 dg/min; and
  ii) less than 5 weight % filler, based upon the weight of the polymers and the filler; and
  iii) a permanent set of greater than 65%; and
  iv) a haze of 20% or less on a 1 mm injection molded chip; and the molded part has:
  a) a thickness of 250 µm to 10 mm; and
  b) a notched Izod impact strength at 23° C. of 80 J/m or more; and
  c) a notched Izod impact strength at 0° C. of 27 J/m or more; and
  d) a 1% secant flexural modulus of 1035 MPa or lower; and
  e) an ultimate elongation where greater than 50% of 5 test specimens suffer no break through extension to 1000%; and
  f) a resistance to stress whitening of Hunter color ΔL of 15 or lower.

2. The molded article of paragraph 1 wherein the molded article has a ΔL of 10 or lower, preferably less than 5, preferably less than zero.
3. The molded article of paragraph 1 or 2 wherein the molded article has a ΔL that is less than 10, a 1% secant flexural modulus less than 865 MPa (preferably less than 690 MPa), a notched Izod impact at 23° C. of greater than 160 J/m (preferably greater than 320 J/m), a notched Izod impact at 0° C. of greater than 40 J/m (preferably greater than 160 J/m) and a haze less than 18%, preferably less than 15%.
4. The molded article of paragraph 1, 2 or 3 wherein the blend has dispersions of semi-amorphous polymer less than 4 μm in size in a continuous phase of semi-crystalline polymer, preferably less than 3 μm in size in a continuous phase of semi-crystalline polymer, preferably less than 2 μm in size in a continuous phase of semi-crystalline polymer, preferably less than 1 μm in size in a continuous phase of semi-crystalline polymer.
5. The molded article of paragraph 1, 2, 3, or 4 where the blend has a haze of 15% or less, preferably 12% or less, preferably 10% or less.
6. The molded article of any of the above paragraphs wherein the blend has a permanent set of 85% or more, preferably 100% or more, preferably 125% or more, preferably 150% or more.
7. The molded article of any of the above paragraphs wherein the blend has a 1% Secant flexural modulus below 690 MPa, preferably below 414 MPa.
8. The molded article of any of the above paragraphs wherein the blend has a melt flow rate of 0.1 to 100 dg/min, preferably 0.5 to 50 dg/min, preferably 0.5 to 30 dg/min.
9. The molded article of any of the above paragraphs wherein the semi-crystalline polymer comprises propylene and from 1 to 3 weight % of a C2 to C10 alpha olefin comonomer, preferably the alpha-olefin comonomer is selected from the group consisting of ethylene, butene, pentene, hexene, heptene, octene, nonene, and decene, preferably the alpha-olefin comonomer is selected from the group consisting of ethylene, butene, hexene, and octene, preferably the alpha-olefin comonomer is ethylene.
10. The molded article of any of the above paragraphs wherein the semi-crystalline polymer comprises 0 weight % comonomer.
11. The molded article of any of the above paragraphs wherein the semi-crystalline polymer has a melting point of 120 to 170° C.
12. The molded article of any of the above paragraphs wherein the semi-crystalline polymer has an Mw/Mn between 1.5 and 4.
13. The molded article of any of the above paragraphs wherein the semi-amorphous polymer comprises propylene and from 10 to 20 weight % of a C2 to C10 alpha olefin comonomer, preferably the alpha-olefin comonomer is selected from the group consisting of ethylene, butene, pentene, hexene, heptene, octene, nonene, and decene, preferably the alpha-olefin comonomer is selected from the group consisting of ethylene, butene, hexene, and octene, preferably the alpha-olefin comonomer is ethylene.
14. The molded article of any of the above paragraphs wherein the semi-amorphous polymer has a percent crystallinity of between 2 and 25%.
15. The molded article of any of the above paragraphs wherein the semi-amorphous polymer has a melt flow rate of 1 to 40 dg/min.
16. The molded article of any of the above paragraphs wherein the semi-amorphous polymer has a melting point between 30 and 80° C.
17. The molded article of any of the above paragraphs wherein the semi-amorphous polymer has a tacticity index of from 4 to 12.
18. The molded article of any of the above paragraphs wherein the semi-amorphous polymer has a triad tacticity of 80% or greater, preferably 85% or greater, preferably 90% or greater.
19. The molded article of any of the above paragraphs wherein the semi-amorphous polymer has an intermolecular composition distribution of 85% ore more, preferably 90% or more by weight of the polymer isolated as one or two adjacent, soluble fractions with the balance of the polymer in immediately preceding or succeeding fractions; and wherein each of these fractions has a weight % comonomer content with a difference of no greater than 20 wt % (relative) of the average weight % comonomer of the copolymer, preferably not greater than 15%, preferably no greater than 10%.
20. The molded article of any of the above paragraphs wherein the molded article has a notched Izod impact strength at 23° C. of 107 J/m or more, preferably 160 J/m or more, preferably 320 J/m or more.
21. The molded article of any of the above paragraphs wherein the molded article has a notched Izod impact strength at 0° C. of 40 J/m or more, preferably 53 J/m or more, preferably 107 J/m or more, preferably 160 J/m or more, preferably 320 J/m or more.
22. The molded article of any of the above paragraphs wherein the molded article has a Gardner impact strength at 23° C. of 11.3 J or more, preferably 22.6 J.
23. The molded article of any of the above paragraphs wherein the molded article has a Gardner impact strength at 0° C. of 5.6 J or more, preferably 11.3 J or more, preferably greater than 22.6 J.
24. The molded article of any of the above paragraphs wherein the molded article has an instrumented impact strength at 23° C. of 10 J or more, preferably 20 J or more, preferably 30 J or more.
25. The molded article of any of the above paragraphs wherein the molded article has an instrumented impact strength at 0° C. of 5 J or more, preferably 10 J or more, preferably 20 J or more, preferably 30 J or more.
26. The molded article of any of the above paragraphs wherein the molded article has a 1% secant flexural modulus at 23° C. of below 863 MPa, preferably 690 MPa, preferably below 414 MPa, preferably below 380 MPa.
27. The molded article of any of the above paragraphs wherein the molded article has a thickness of from 254 μm to 5 cm, preferably 750 μm, to 1 cm, preferably 1200 μm to 5 mm, preferably 2500 μm to 3 mm.
28. The molded article of any of the above paragraphs wherein the semi-amorphous polymer comprises from 11 to 25 weight % comonomer and is present at from 15 to 40 weight %, and wherein the blend has dispersions of semi-amorphous polymer less than 4 μm in size in a continuous phase of semi-crystalline polymer and wherein the molded article has:
  a) a thickness of 254 μm to 5 mm; and
  b) a notched Izod impact strength at 23° C. of 96 J/m or more; and
  c) a notched Izod impact strength at 0° C. of 45 J/m or more; and
  d) a 1% secant flexural modulus at 23° C. of 800 MPa or lower; and e) a Gardner impact strength at 23° C. of 23 J or more; and f) a Gardner impact strength at 0° C. of 15 J or more; and g) an instrumented impact strength at 23° C. of 20 J or more.

29. The molded article of any of the above paragraphs wherein the semi-amorphous polymer comprises from 11 to 25 weight % comonomer and is present at from 25 to 40 weight %, and wherein the blend has dispersions of semi-amorphous polymer less than 4 μm in size in a continuous phase of semi-crystalline polymer and wherein the molded article has:

a) a thickness of 254 μm to 5 mm; and b) a notched Izod impact strength at 23° C. of 320 J/m or more; and c) a notched Izod impact strength at 0° C. of 160 J/m or more; and d) a 1% secant flexural modulus at 23° C. of 660 MPa or lower; and e) a Gardner impact strength at 23° C. of 23 J or more; and f) a Gardner impact strength at 0° C. of 23 J or more; and g) an instrumented impact strength at 23° C. of 30 J or more.

30. The molded article of any of the above paragraphs wherein the blend of the semi-amorphous and semi-crystalline polymers further comprises plasticizer, preferably the plasticizer comprises poly-alphaolefin, preferably polydecene.

31. The molded article of any of the above paragraphs wherein the heterogeneous blend further comprises slip agent, preferably the slip agent comprises 50 to 5000 ppm of an amides having the chemical structure $CH_3(CH_2)_7CH=CH(CH_2)_xCONH_2$ where x is 5 to 15.

32. The molded article of any of the above paragraphs wherein the heterogeneous blend further comprises a clarifying agent, preferably the clarifying agent is present at 10 ppm to 10 weight % (more preferably 25 ppm to 5 weight %, preferably 50 ppm to 4000 ppm, based on total polymer in the blend composition) of an organophosphate, phosphate ester, sodium benzoate, talc, sorbitol, adipic acid, benzoic acid, (or metal salts of these acids), inorganic fillers, preferably the clarifying agent is a sorbitol-based agents, aluminum salt based agents, or sodium salt based agents, or a Ziegler-Natta olefin product or other highly crystalline polymers, preferably the clarifying agent is disodium[2.2.1]heptane bicyclodicarboxylate, bis (3,4 dimethylbenzylidene)sorbitol, sodium 2,2'-methylene-bis (4,6-di-tert-butylphenyl)phosphate, (p-chloro, p'methyl) dibenzylidene sorbitol, bis(p-ethylbenzylidene)sorbitol, 1,2,3,4-dibenzylidene sorbitol, 1,2,3,4-di-para-methylbenzylidene sorbitol, and or aluminum 2,2'-methylene-bis (4,6-di-tert-butylphenyl)phosphate.

33. The molded article of any of the above paragraphs wherein the blend has a haze of 15% or less on a 1 mm injection molded chip, and wherein the molded article has:

a) an ultimate elongation at 23° C. of greater than 1000%, b) a 1% secant flexural modulus at 23° C. of 540 MPa or less, c) a notched Izod impact strength at 0° C. of greater than 320 J/m;

d) a Gardner impact strength at 0° C. of greater than 26 J, where failure, if any, is in the ductile mode, e) an instrumented impact strength at 0° C. of greater than 30 J where failure, if any, is in the ductile mode, and f) a resistance to stress whitening of Hunter color ΔL of less than 10.

34. A package comprising the molded article of any of the above paragraphs.

EXAMPLES

Mw, Mn, Mz were measured by Gel Permeation Chromatography, as described above.

Mooney Viscosity is measured according to ASTM D 1646.

Melt flow rate (MFR) was measured according to ASTM D 1238 condition L at 230° C. under a load of 2.16kg.

Ethylene weight % was measured as follows. A thin homogeneous film was pressed at a temperature of about 150° C. or greater, then mounted on a Perkin Elmer PE 1760 infrared spectrophotometer. A full spectrum of the sample from 600 $cm^{-1}$ to 4000 $cm^{-1}$ was recorded and the monomer weight percent of ethylene was calculated according to the following equation: Ethylene wt %=82.585-111.987X+ 30.045 $X^2$, wherein X is the ratio of the peak height at 1155 $cm^{-1}$ and peak height at either 722 $cm^{-1}$ or 732 $cm^{-1}$, whichever is higher.

Glass Transition Temperature (Tg), β relaxation, Loss Modulus (E") and Storage Modulus (E') were measured by dynamic mechanical thermal analysis (DMTA). The instrument used was the RSA II, Rheometrics Solid Analyzer II from TA Instruments, New Castle, Del. The instrument was operated in tension mode and used molded rectangular samples. Sample conditions were: 0.1% strain, 1 Hz frequency, and 2 degree C. per minute heating rate, covering the temperature range from −135 C to the melting point of the sample. Samples were molded at about 200 C. Typical sample dimensions were 23 mm length×6.4 mm width×thickness between 0.25 mm and 0.7 mm, depending on the sample. tan δ is the ratio of E"/E', where E' is the Storage Modulus and E" is the Loss Modulus. The output of these DMTA experiments is the storage modulus (E') and loss modulus (E"). The storage modulus measures the elastic response or the ability of the material to store energy, and the loss modulus measures the viscous response or the ability of the material to dissipate energy. The ratio of E"/E' (=tan [δ]) gives a measure of the damping ability of the material. Energy dissipation mechanisms (i.e., relaxation modes) show up as peaks in tan [δ], and are associated with a drop in E' as a function of temperature. The uncertainty associated with reported values of E' is expected to be on the order of ±10%, due to variability introduced by the molding process.

Crystallization temperature (Tc), melting temperature ($T_m$) and heat of fusion (Hf, ΔH, or $ΔH_f$) were measured using Differential Scanning Calorimetry (DSC). This analysis was conducted using either a TA Instruments MDSC 2920 or a Perkin Elmer DSC7. Typically, 6 to 10 mg of molded polymer or plasticized polymer was sealed in an aluminum pan and loaded into the instrument at room temperature. Melting data (first heat) were acquired by heating the sample to at least 30° C. above its melting temperature at a heating rate of 10° C./min. This provides information on the melting behavior under as-molded conditions, which can be influenced by thermal history as well as any molded-in orientation or stresses. The sample was then held for 10 minutes at this temperature to destroy its thermal history. Crystallization data was acquired by cooling the sample from the melt to at least 50° C. below the crystallization temperature at a cooling rate of 10° C./min. Typically, the blend samples were cooled down to −25 C. The sample was then held at this temperature for 10 minutes, and finally heated at 10° C./min to acquire additional melting data (second heat). The melting temperatures reported in the tables are the peak melting temperatures from the second heat unless otherwise indicated. For polymers displaying multiple peaks, the higher melting peak temperature is reported. Areas under the curve were used to determine the heat of fusion ($\Delta H_f$) which can be used to calculate the degree of crystallinity. A value of 189 J/g was used as the equilibrium heat of fusion for 100% crystalline polypropylene. The percent crystallinity of a propylene polymer is calculated using the formula, [area under the curve (J/g)/189 (J/g)]*100.

Blend haze (both total and internal) was measured according to ASTM D 1003 (including that 2500 ppm of bis (3,4 dimethylbenzylidene)sorbitol (Millad 3988) was added to the blend prior to forming the blend into the molded 1 mm chip). Molded article Haze was also measured according to ASTM-D 1003. Unless otherwise indicated the haze value reported is total haze.

Gloss was measured according to ASTM D 2457 at a 45° angle.

Yield Tensile Strength is measured according to ASTM D-638.

Yield Strain or Elongation is measured according to ASTM D-638.

Ultimate Tensile Strength is measured according to ASTM D-638.

Ultimate Elongation is measured according to ASTM D-638.
Young's Modulus is measured according to ASTM D-638.
1% Secant Flexural Modulus is measured according to ASTM D-790 A.
Heat Distortion Temperature is measured at 1.8 MPa (264 psi) according to ASTM D648.
Gardner Impact is measured according to ASTM D-5420.
Notched Izod Impact is measured according to ASTM D-256
Instrumented Impact is measured according to ASTM D-3763.

Example 1

Copolymerization to form the Semi-Amorphous Propylene-Ethylene Copolymers (SAPEC)

Continuous polymerization was conducted in a 9 liter continuous flow stirred tank reactor using hexane as the solvent. The liquid full reactor had a residence time of 9 minutes and the pressure was maintained at 700 kPa. A mixed feed of hexane, ethylene and propylene was pre-chilled to approximately −30° C. to remove the heat of polymerization, before entering the reactor. A solution of catalyst/activator in toluene and the scavenger in hexane were separately and continuously admitted into the reactor to initiate the polymerization. The reactor temperature was maintained between 35 and 50° C., depending on the target molecular weight. The feed temperature was varied, depending on the polymerization rate to maintain a constant reactor temperature. The polymerization rate was varied from 0.5 kg/hr to 4 kg/hr. Hexane at 30 kg/hr was mixed with ethylene at 717 g/hr and propylene at 5.14 kg/hr and fed to the reactor. The polymerization catalyst, dimethyl silyl bis-indenyl hafnium dimethyl activated in a 1:1 molar ratio with N',N'-dimethyl anilinium-tetrakis (pentafluorophenyl)borate was introduced at the rate of 0.0135 g/hr. A dilute solution of triisobutyl aluminum was introduced into the reactor as a scavenger of catalyst terminators at a rate of approximately 111 mole of scavenger per mole of catalyst. After five residence times of steady polymerization, a representative sample of the polymer produced in this polymerization was collected. The solution of the polymer was withdrawn from the top and then steam distilled to isolate the polymer. The polymerization rate was measured at 3.7 kg/hr. The polymer produced in this polymerization had an ethylene content of 14%, Mooney viscosity ML (1+4) at 125° C. of 13.1 and had isotactic propylene sequences. Variations in the composition of the polymer were obtained principally by changing the ratio of ethylene to propylene.

Molecular weight of the polymer was varied by either changing the reactor temperature or by changing the ratio of total monomer feed rate to the polymerization rate. Dienes for terpolymerization were added to the mixed feed stream entering the reactor by preparing the diene in a hexane solution and metering it in the required volumetric amount.

In the manner described in Example 1 above, several semi-amorphous propylene-ethylene copolymers (SAPEC) were synthesized. These are described in Table 1. Samples SAPEC-1 (7 MFR or 10 Mooney viscosity ML (1+4) at 125° C., 14.5 wt % ethylene) and SAPEC-2 (2.5 MFR, 14.9 wt % ethylene) were utilized to prepare the inventive blends. The preparation of these blends is discussed below. Samples SAPEC-3 through SAPEC-7 were utilized to demonstrate the inherent narrow composition distribution of these polymers.

TABLE 1

Characterization of Semi-Amorphous Propylene-Ethylene Copolymers

| SAPEC | ML(1 + 4) at 125 C. | Mw# | Mn# | Ethylene Wt %* | Tm dsc ° C. |
|---|---|---|---|---|---|
| SAPEC-1 | 7.0** | | | 14.5 | |
| SAPEC-2 | 2.5** | | | 14.9 | |
| SAPEC-3 | 14 | 248900 | 102000 | 7.3 | 84.7 |
| SAPEC-4 | 23.9 | 265900 | 124700 | 11.6 | 43.0 |
| SAPEC-5 | 33.1 | 318900 | 121900 | 16.4 | 42.2 |
| SAPEC-6 | 34.5 | | | 11.1 | 63.4 |
| SAPEC-7 | 38.4 | | | 14.7 | 47.8 |

**MFR values (dg/min) by ASTM D-1238 Cond L
GPC data in daltons
*Ethylene wt % measured by IR procedure described earlier.

The semi-amorphous propylene-ethylene copolymers, which are derived from chiral metallocene-based catalysts, have a narrow inter and intramolecular composition distribution. The intermolecular composition distribution of the polymer was determined by thermal fractionation in hexane as follows: about 30 g of the crystallizable propylene-ethylene copolymer was cut into small cubes about ⅛th inch (0.32 cm) on the side and then introduced into a thick-walled glass bottle closed with screw cap along with 50 mg of Irganox 1076 antioxidant (Ciba-Geigy Corpn). 425 ml of hexane (a principal mixture of normal and iso-isomers) was added to the contents of the bottle and the sealed bottle was maintained at 23° C. for 24 hours. At the end of this period, the solution was decanted and the residue was treated with additional hexane for an additional 24 hours. At the end of this period, the two hexane solutions were combined and evaporated to yield a residue of the polymer soluble at 23° C. To the residue was added sufficient hexane to bring the volume to 425 ml and the bottle was maintained at 31° C. for 24 hours in a covered circulating water bath. The soluble polymer was decanted and an additional amount of hexane is added for another 24 hours at 31° C., prior to decanting. In this manner, fractions of the semi-amorphous propylene-ethylene copolymer soluble at 40° C., 48° C., 55° C. and 62° C. were obtained, at temperature increases of approximately 8° C. between stages. The soluble polymers were dried, weighed and analyzed for composition, as wt % ethylene content, by the IR technique described above. Soluble fractions obtained in the adjacent temperature increases are the adjacent fractions in the specification above. Data on different representative semi-amorphous propylene-ethylene copolymers are shown in Tables 2 and 3. EPR in Table 2 is an ethylene propylene rubber that does not contain crystallizable propylene species like the semi-amorphous copolymers. This EPR has 47% ethylene, a Mooney viscosity (ML 1+8 at 127 C ) of 28 and a GPC polydispersity (Mw/Mn) of 2.3. It was obtained under the tradename Vistalon™ 457-by ExxonMobil Chemical in Houston, Tex.

TABLE 2

Solubility of Fractions of SAPEC's

| SAPEC | Fraction 1 - Wt % soluble at 23° C. | Fraction 2 - Wt % soluble at 31° C. | Fraction 3 - Wt % soluble at 40° C. | Fraction 4 - Wt % soluble at 48° C. |
| --- | --- | --- | --- | --- |
| SAPEC-3 | 1.0 | 2.9 | 28.3 | 68.5 |
| SAPEC-4 | 6.5 | 95.7 | — | — |
| SAPEC-5 | 51.6 | 52.3 | — | — |
| SAPEC-6 | 18.7 | 83.6 | — | — |
| SAPEC-7 | 36.5 | 64.2 | — | — |
| EPR | 101.7 | — | — | — |

Note:
The sum of the fractions may in some cases add up to slightly greater than 100, due to imperfect drying of the polymer fractions.

TABLE 3

Composition of Fractions of SAPEC's obtained in Table 2

| SAPEC | Wt % ethylene in Fraction 1 | Wt % ethylene in Fraction 2 | Wt % ethylene in Fraction 3 | Wt % ethylene in Fraction 4 |
| --- | --- | --- | --- | --- |
| SAPEC-3 | | | 8.0 | 7.6 |
| SAPEC-4 | 12.0 | 11.2 | — | — |
| SAPEC-5 | 16.8 | 16.5 | — | — |
| SAPEC-6 | 13.2 | 11.2 | — | — |
| SAPEC-7 | 14.9 | 14.6 | — | — |
| EPR | 46.8 | | | |

Note:
Only fractions with more than 4% of the total mass of the polymer in Table 2 are analyzed for composition. The experimental accuracy in determination of the ethylene content is believed to be within about 0.4% absolute.

The above semi-amorphous propylene-ethylene copolymers SAPEC-1 and SAPEC-2 were combined with a metallocene-based propylene homopolymer to produce the blend compositions, as will be described later. SAPEC-1 was first visbroken neat to reach an MFR of about 35 dg/min prior to melt blending with polypropylene (a metallocene-based 34 dg/min MFR homopolypropylene), at different levels, to produce different blend compositions. SAPEC-2 was first combined with polypropylene (a 7.5 MFR metallocene-based polypropylene homopolymer) at a ratio of 60 wt % copolymer and 40 wt % homopolymer, then visbroken to reach an MFR of about 20 dg/min. This 60/40 blend product was then letdown with varying amounts of a 24 dg/min MFR metallocene-based homopolymer, to produce different blend compositions. Both approaches outlined above worked satisfactorily. The second procedure of visbreaking the SAPEC in combination with polypropylene provides additional crystallinity to the product being visbroken. This additional crystallinity aids in the extrusion compounding step by providing rapid solidification of the extruded strands in the water bath, easier chopping of the strands into pellets and free movement of the pellets through transfer lines.

Visbreaking is a widely used and well-accepted procedure to increase the melt flow rate of propylene polymers. The procedure typically involves melt compounding the propylene polymer in the presence of a specific amount of a peroxide [e.g. (2,5 dimethyl-2,5-di(t-butyl peroxy)hexane) available as Luperox 101 from AtoFina, Organic Peroxides Divn., Philadelphia, Pa.]. The amount is dependent on the degree of MFR increase desired.

Example 2

Visbreaking of Semi-amorphous Propylene-Ethylene Copolymers SAPEC-1 and SAPEC-2

SAPEC-1 was visbroken neat, using a 30 mm, twin-screw, ZSK extruder. 0.05 wt % of peroxide (Luperox 101) was used to increase the MFR from an MFR of 7 dg/min (10 Mooney viscosity [ML(1+4) at 125° C.] to an MFR of 35 dg/min. The visbroken SAPEC had an MFR of 35 dg/min, an Mn of 65,000, an Mw of 131,000, an Mz of 213,000, 14.5 wt % ethylene, a DSC melting point (Tm) of 53° C., and a heat of fusion (ΔH) of 19.6 J/g. The visbroken SAPEC-1 was compounded with different amounts of a metallocene-based homopolymer to prepare blends, as will be described below. The visbroken SAPEC-1 was identified as Example 2-1.

SAPEC-2 was visbroken in the presence of a propylene homopolymer. This propylene homopolymer, having an MFR of 7.5 dg/min and an Mw of 195,000 was produced using a metallocene catalyst, namely, rac di-methyl siladiyl bis-(2-methyl, 4-phenyl indenyl) zirconium dimethyl activated with a silica bound activator of N,N-di-ethyl aniline tris(perfluorophenyl)boron in a pilot scale, two reactor, continuous, stirred tank, bulk liquid-phase process. In the catalyst, the zirconium loading was about 0.117 wt % and the boron loading about 0.12 wt %. The reactors were equipped with jackets for removing the heat of polymerization. The reactor temperature was set at 74° C. (165 F) in the lead reactor and 68° C. (155 F) in the tail reactor. Catalyst was fed at a rate of 1.2 g/hr. Tri-ethyl aluminum (TEAL; fed to the reactor as a 1 wt % solution in hexane solvent) was used as scavenger at a level of 20 ppm. The catalyst and silica bound activator, described above, were fed as a 10% slurry in mineral oil and were flushed into the reactor with propylene. Propylene monomer was fed into the lead reactor at a rate of 79.5 kg/hr (175 lb/hr) and to the tail reactor at a rate of 30 kg/hr (65 lb/hr). Hydrogen was added for molecular weight control at 1970 mppm in the lead reactor and 2220 mppm in the tail reactor. Polymer production rates were 20.5 kg/hr (45 lb/hr) in the lead reactor and 10 kg/hr (22 lb/hr) in the tail reactor. The reactor product was routed through a granules-handling system to separate and recover the final polymer product. The polymer discharged from the reactors had an MFR of 7.5 dg/min (GPC Mw 195,000, Mw/Mn 2.0, Mz/Mw 1.54). 68% of the final polymer product was derived from the first stage and 32% of the final product was derived from the second stage. The polymer was melt homogenized with 1500 ppm of Irganox-2215 (Ciba-Geigy Corporation) and pelletized. Visbreaking was conducted on a blend of SAPEC-2 with the 7.5 MFR propylene homopolymer discussed above. The blend ratio was 60 wt % SAPEC and 40 wt % propylene homopolymer. The visbreaking was carried out on a Reifenhauser extruder equipped with a single screw (60 mm screw diameter; 24:1 L/D ratio; mixing screw) with 0.08 wt % peroxide. The blend, post treatment, was identified as Example 2-2. It had an MFR of 20 dg/min.

TABLE 3a

Visbreaking of SAPEC-1 and SAPEC-2

| Example | Copolymer | Peroxide (ppm) | Post treatment MFR dg/min |
|---|---|---|---|
| Example 2-1 | SAPEC-1 | 500 | 35 |
| Example 2-2 | SAPEC-2 | 800 | 20 |

Examples 2-1 and 2-2 were used to prepare blends with propylene homopolymer containing different amounts of semi-amorphous propylene-ethylene copolymer.

Example 3

Preparation of Blends of Visbroken Semi-Amorphous Propylene-Ethylene Copolymer (Example 2-1) and Propylene Homopolymer B Propylene homopolymer B was prepared according to the general polymerization procedure outlined in Example 2, except that the polymerization was carried out on a 110 kton per annum line. The line comprised a two-reactor, continuous, stirred tank, bulk liquid-phase process. This line is a commercial size scale-up of the reactor facilities described previously in Example 2, along with facilities for product finishing. Reactor conditions comparable to those outlined in Example 2 were set, to produce a 34 dg/min MFR homopolymer. The polymer was stabilized with 250 ppm of Irganox-1076 and 750 ppm of calcium stearate and pelletized.

Visbroken SAPEC-1 (Example 2-1 at 35 dg/min MFR) was melt homogenized on a 30 mm, twin screw, ZSK extruder with different amounts of the 34 dg/min MFR homopolymer B described above, to produce the blends (Examples 3-1, 3-2, 3-3 and 3-4) listed in Table 4.

GPC and DSC characterization data on these blends are presented in Table 5.

TABLE 4

Description of Blends of Visbroken SAPEC-1 (Example 2-1) and Metallocene Homopolymer B

| Example | Visbroken SAPEC-1 (wt %) | 34 dg/min MFR Homopolymer B (wt %) | MFR dg/min | Ethylene wt % |
|---|---|---|---|---|
| Ex. 3-1 | 10 | 90 | 31.3 | 1.5 |
| Ex. 3-2 | 20 | 80 | 32.2 | 2.9 |
| Ex. 3-3 | 30 | 70 | 31.7 | 4.4 |
| Ex. 3-4 | 40 | 60 | 31.9 | 5.8 |

Note:
400 ppm Ultranox 626 stabilizer (GE Specialty Chem, Morgantown, WV) added during melt compounding

TABLE 5

Characterization Data on Blend Examples 3-1 to 3-4

|  | Example 3-1 | Example 3-2 | Example 3-3 | Example 3-4 |
|---|---|---|---|---|
| GPC data |  |  |  |  |
| Mn (daltons) | 66,000 | 66,000 | 64,000 | 68,000 |
| Mw (daltons) | 140,000 | 139,000 | 136,000 | 133,000 |
| Mz (daltons) | 223,000 | 225,000 | 215,000 | 210,000 |
| DSC data |  |  |  |  |
| Tm (° C.) | 151.9 | 151.2 | 151.2 | 151.0 |
| Heat of fusion (J/g) | 86.3 | 75.5 | 66.5 | 55.9 |
| Tc (° C.) | 113.3 | 112.5 | 112.7 | 111.6 |

Example 4

Preparation of Blends from Visbroken SAPEC-2/Propylene Homopolymer (60/40) Mix (Example 2-2) and ACHIEVE™ 3854 (24 MFR homopolymer)

Example 2-2 (20 MFR visbroken 60/40 blend of SAPEC-2 and 7.5 MFR propylene homopolymer) was melt homogenized on a Reifenhauser single-screw extruder (60 mm screw, 24:1 L/D ratio) with varying amounts of ACHIEVE™ 3854, a metallocene-based propylene homopolymer having an MFR of 24 dg/min (ASTM D-1238, 2.16 kg, 230° C.), a density of 0.9 g/cc (ASTM D 792), an Mw/Mn of 2 and containing 250 ppm Irganox-1076, 750 ppm calcium stearate available from ExxonMobil Chemical Company in Houston, Tex. The compositions of the blends are outlined in Table 6. Millad 3988 is a clarifier agent (Milliken Chemical, Spartanburg, S.C.), used in some of the formulated compounds. MCN-1 refers to the low MFR (7.5) metallocene homopolymer used as an aid during the visbreaking operation (prepared as described in Example 2). Characterization data on the blends are shown in Table 7.

TABLE 6

Description of Blends from Example 2-2 (Visbroken SAPEC-2/Propylene Homopolymer Mix) and ACHIEVE ™ 3854 (24 MFR homopolymer)

| Example | SAPEC-2 (wt %) | MCN-1 (wt %) | Achieve 3854 (wt %) | MFR (dg/min) | Ethylene (wt %) | Millad 3988 (ppm) |
|---|---|---|---|---|---|---|
| Ex. 4-1 | 33.3 | 22.2 | 44.5 | 21.1 | 5.0 | 0 |
| Ex. 4-2 | 10 | 6.6 | 83.4 | 22.4 | 1.5 | 2500 |
| Ex. 4-3 | 25 | 16.5 | 58.5 | 21.9 | 3.7 | 2500 |
| Ex. 4-4 | 25 | 16.5 | 58.5 | 21.4 | 3.7 | 0 |
| Ex. 4-5 | 30 | 20 | 50 | 21.1 | 4.5 | 2500 |
| Ex. 4-6 | 30 | 20 | 50 | 21.0 | 4.5 | 0 |
| Ex. 4-7 | 40 | 26.5 | 33.5 | 21.0 | 6.0 | 2500 |

TABLE 7

Characterization Data on Blend Examples 4-1 to 4-7

|  | Mn | Mw | Mz | DSC Tm | Heat of fusion | DSC Tc |
|---|---|---|---|---|---|---|
|  | (daltons) | | | (° C.) | (J/g) | (° C.) |
| Example 4-1 | 88,000 | 148,000 | 214,000 | 149.7 | 69.3 | 113.5 |
| Example 4-2 | 80,000 | 154,000 | 231,000 | 152.0 | 91.1 | 122.5 |
| Example 4-3 | 88,000 | 154,000 | 226,000 | 152.1 | 78.3 | 122.7 |
| Example 4-4 | 91,000 | 153,000 | 224,000 | 149.4 | 75.0 | 112.4 |
| Example 4-5 | 89,000 | 153,000 | 230,000 | 152.2 | 69.8 | 123.4 |

TABLE 7-continued

Characterization Data on Blend Examples 4-1 to 4-7

|  | Mn | Mw (daltons) | Mz | DSC Tm (° C.) | Heat of fusion (J/g) | DSC Tc (° C.) |
|---|---|---|---|---|---|---|
| Example 4-6 | 86,000 | 151,000 | 226,000 | 149.9 | 68.4 | 112.8 |
| Example 4-7 | 87,000 | 149,000 | 221,000 | 152.2 | 61.4 | 124.5 |

Note:
DSC data (especially Tc) reflect the presence (or absence) of clarifying/nucleating agent The blends of Examples 3-1 to 3-4 and Examples 4-1 to 4-7 are all based on semi-amorphous propylene-ethylene copolymers that contain upwards of 14 wt % ethylene (SAPEC-1 at 14.5 wt % and SAPEC-2 at 14.9 wt %). This immiscibility leads to heterogeneous blends, with the semi-amorphous propylene-ethylene copolymers being finely dispersed in a matrix of polypropylene, or being co-continuous with polypropylene, depending on the relative amount of the semi-amorphous propylene-ethylene copolymer. A representation of this is shown in FIG. 2A, which is a plot of tan δ (E"/E' from DMTA measurements) versus temperature. The figure shows tan δ responses. For Examples 3-1 to 3-4 (10, 20, 30 and 40 wt % SAPEC-1) in the region of the β relaxation (ie. Tg) two distinct peaks are observed, corresponding to the respective Tgs of the polypropylene (at 0° C.) and the semi-amorphous propylene-ethylene copolymer (−25° C.). Similar behavior is noted for the blends based on SAPEC-2. FIG. 2B is a plot of tan δ versus temperature for Example 4-1, again showing distinct tan δ peaks, corresponding to the polypropylene and the semi-amorphous propylene-ethylene copolymer.

The heterogeneous morphology of the blends can be directly observed from the Atomic Force Microscopy (AFM) micrographs (Field of view: 20 μm×20 μm) shown in FIG. 3. Example 3-4 (40% visbroken SAPEC-1, no clariflying agent) is on the left and Example 4-7 (40% visbroken SAPEC-2, contains clariflying agent) is on the right. The figure shows the morphology of injection molded ASTM bars. The dark areas are the locations of the semi-amorphous propylene-ethylene copolymer and the lighter areas the polypropylene. The two Examples (3-4 and 4-7) have the same content of semi-amorphous propylene-ethylene copolymer (40 wt %). The micrographs suggest an orientation or directionality along the horizontal axis, believed to be the flow direction during injection molding. Polypropylene lamellae are visible in the figure. The fibrillar morphology aligned along the flow direction, displayed in FIG. 3, has been suggested as being desirable for good transparency (Macromol. Symp. 78, 213-228, 1994). One difference noted between the two Examples is that the morphology of Example 4-7 appears more open or less packed, while that of Example 3-4 appears more dense. This is believed due to the presence of nucleating/clarifying agent in Example 4-7.

Example 5

Fabrication of Molded Parts

Examples 3-1 to 3-4 and Examples 4-1 to 4-7, along with associated controls, were injection molded to produce test specimens. For standard ASTM test results, a mold that produces a family of ASTM test specimens (e.g. dumbbell bars for tensile testing, circular disks for Gardner impact testing, etc.) was used. Other molds used produced haze chips (1 mm thickness) for haze measurements and 4 inch (101.6 mm) circular disks for instrumented impact testing (SFS Dynatup 8250, General Research Corpn., Santa Barbara, Calif.). The molding was done on a 120 Ton Van Dorn injection press (HT series, toggle clamp injection molding machine) using ASTM molding conditions for polypropylene (D4101-01a).

Example 6

Molded Part Properties

Molded part properties for blend Examples 3-1 to 3-4 are shown in Table 8.

TABLE 8

Injection Molded-Part Properties for Blend Examples 3-1 to 3-4

|  | Example | | | |
|---|---|---|---|---|
|  | Ex 3-1 | Ex. 3-2 | Ex.-3-3 | Ex. 3-4 |
| Visbroken SAPEC-1 | 10 | 20 | 30 | 40 |
| Total ethylene amount (wt %) | 1.5 | 2.9 | 4.4 | 5.8 |
| Yield Tensile, psi(MPa) | 4166(28.7) | 3263(22.5) | 2875(19.8) | 2246(15.5) |
| UltimateTensile, psi(MPa) | No break | No break | 2100(14.5) | No break |
| Ultimate Elongation (%) | No break | No break | 641(3/5-no break) | No break |
| Young's Modulus, kpsi(MPa) | 191(1317) | 124(858) | 105(723) | 79(544) |
| 1% Secant Flex Mod. kpsi(MPa) | 146.7(1012) | 102.6(708) | 76.8(530) | 52.9(365) |
| Heat Distortion Temp (° C.) at 264 psi/1.8 MPa | 51.3 | 46.9 | 42.5 | 39.7 |
| Gardner impact in.lb(J) @ 23° C. [failure mode] | 207 (23.4) [4S, 3DB, 6D] | 217 (24.5) [1DB, 11D] | 230 (26) [13D] | 215 (24.3) [14D] |
| Gardner impact in.lb(J) @ −29° C. [failure mode] | <10 (<1.15) [5S] | <10 (<1.15) [1B, 4S] | <10 (<1.15) [3B, 2S] | <10 (<1.15) [3B, 2S] |
| Izod impact ft.lb/in(J/m) @ 23° C. notched [failure mode] | 0.64 (34.2) [complete brk] | 0.97 (51.8) [complete brk] | 1.87 (99.8) [complete brk] | no break [no break] |
| Izod impact ft.lb/in(J/m) @ −18° C. notched [failure mode] | 0.34 (18.1) [complete brk] | 0.37 (19.8) [complete brk] | 0.44 (23.5) [complete brk] | 0.85 (45.4) [complete brk] |
| Instrumented impact, ft.lb(J) | 21.7 (29.4) | 25.8 (35.0) | 23.3 (31.6) | 21.5 (29.2) |

TABLE 8-continued

Injection Molded-Part Properties for Blend Examples 3-1 to 3-4

|  | Ex 3-1 | Ex. 3-2 | Ex.-3-3 | Ex. 3-4 |
|---|---|---|---|---|
| @ 23° C. (25 lb, 15 mph) [failure mode] | [1B, 1DB, 3D] | [5D] | [5D] | [5D] |
| Instrumented impact, ft.lb(J) @ 0° C. (25 lb, 15 mph) [failure mode] | 1.7 (2.3) [5B] | 7.4 (10.0) [3B, 2BD] | 28.5 (38.6) [5D] | 26 (35.3) [5D] |
| Instrumented impact, ft.lb(J) @ −18° C. (25 lb, 15 mph) [failure mode] | | | 10.6 (14.4) [1B, 4BD] | 25.8 (35.0) [2DB, 3D] |

Notes:
Tensile elongation test limit is 1000%; values >1000% are shown as 'no break'
S = Brittle shatter,
B = brittle,
BD = Brittle-ductile,
DB = Ductile-brittle,
D = Ductile (in order of increasing ductility) [for example 5B means 5 samples broke with brittle failure mode].

The data in Table 8 show the heterogeneous blends to display good toughness properties, particularly at semi-amorphous propylene-ethylene copolymer levels above ~25 wt %. At 30 and 40 wt %, the heterogeneous blends are ductile down to 0° C. If low modulus ("soft") articles are desired, blends at 30 and 40 wt % of the semi-amorphous propylene-ethylene copolymer offer a combination of high tensile extensibility, low modulus and high impact strength with ductility down to 0° C.

The clarity of these heterogeneous blends, together with strength and toughness properties can be seen in the data of Table 9, which shows the properties of heterogeneous blend Examples 4-1 through 4-7. In the table, the abbreviations for failure mode are S=Brittle shatter, B=brittle, BD=brittle-ductile, DB=ductile-brittle, D=ductile. Blend Examples 4-1 through 4-7 span the range 10 to 40 wt % of semi-amorphous propylene-ethylene copolymer and 0 to 2500 ppm of Millad 3988 clarifying (nucleating) agent.

TABLE 9

Injection Molded-Part Properties for Blend Examples 4-1 to 4-7

|  | Example 4-1 | Example 4-2 | Example 4-3 | Example 4-4 | Example 4-5 | Example 4-6 | Example 4-7 |
|---|---|---|---|---|---|---|---|
| Visbroken SAPEC-2, wt % | 33.3 | 10 | 25 | 25 | 30 | 30 | 40 |
| Clarifier additive, ppm | 0 | 2500 | 2500 | 0 | 2500 | 0 | 2500 |
| Yield Tensile, psi (MPa) | 2527 (17.4) | 4653 (32.1) | 3324 (22.9) | 3040 (21.0) | 2937 (20.3) | 2702 (18.6) | 2293 (15.8) |
| Yield Strain, % | 20.3 | 10.0 | 14.4 | 16.6 | 17.5 | 18.7 | 23.0 |
| Ultimate Tensile, psi (MPa) | no brk | 2803 (19.3) (4/5 no brk) | 2229 (15.4) (1/5 no brk) | no brk | 2066 (14.3) (4/5 no brk) | no brk | no brk |
| Ultimate Elong, % | no brk | 937 (4/5 no brk) | 616 (1/5 no brk) | no brk | 496 (4/5 no brk) | no brk | no brk |
| 1% Sec Flex Mod, kpsi (MPa) | 71.3 (492) | 188.2 (1298) | 115.7 (798) | 96.9 (669) | 95.9 (662) | 77.6 (535) | 66.5 (459) |
| Heat Distortion Temp, C. (at 264 psi or 1.8 MPa) | 42.5 | 55.2 | 48.4 | 45.6 | 47.2 | 44.5 | 42.1 |
| Gardner Impact, in.lb (J) | | | | | | | |
| At 23 C. | 234 (26.4) | 112 (12.7) | 218.5 (24.7) | 243.3 (27.5) | 227 (25.7) | 233 (26.3) | 209 (23.6) |
| Failure mode | 12D | 5S, 9DB | 14D | 14D | 13D | 12D | 13D |
| At 0 C. | 241 (27.2) | <10 (<1.15) | 209 (23.6) | 250 (28.2) | 242 (27.3) | 247 (27.9) | 249 (28.2) |
| Failure mode | 12D | All S or B | 5S, 8DB, 4D | 1S, 1DB, 11D | 13D | 12D | 13D |
| Izod Impact, ft.lb/in (J/m) | | | | | | | |
| At 23 C., notched | no brk | 0.9 (48.6) | 6.8 (365.1) | 1.8 (97.5) | no brk | 6.1 (325.6) | no brk |
| Failure mode | no brk | complete brk | partial brk | complete brk | no brk | partial brk | no brk |
| At 0 C., notched | 1.7 (90.4) | 0.3 (15.5) | 1.0 (53.4) | 0.9 (46.9) | 6.9 (367.5) | 1.4 (73.2) | no brk |
| Failure mode | complete brk | complete brk | complete brk | complete brk | hinged brk | complete brk | no brk |
| Instrumented Impact, ft.lb (J) | | | | | | | |
| At 23 C. (25 lb, 15 mph) | 29.6 (40.1) | 6.0 (8.1) | 26.9 (36.5) | 27.3 (37) | 25.2 (34.2) | 25.3 (34.3) | 22.6 (30.6) |
| Failure mode | 5D | 5B | 5D | 5D | 5D | 5D | 5D |
| At 0 C. (25 lb, 15 mph) | 30.8 (41.7) | — | 9.1 (12.3) | 32.1 (43.6) | 32.7 (44.3) | 30.4 (41.2) | 28.0 (38.0) |
| Failure mode | 5D | — | 5B | 5D | 5D | 5D | 5D |
| Total/Internal Haze, % (1 mm thick molded chip) | 43/43 | 10/9 | 13/12 | 52/52 | 13/13 | 49/49 | 12/12 |

Table 9 reinforces the good toughness of the blend Examples, as observed in Table 8. Gardner impact strength values are all upwards of 200 in.lb (22 J), except for Example 4-2 which has only 10% of semi-amorphous propylene-ethylene copolymer. This is true at both 23° C. and 0° C. At levels of semi-amorphous propylene-ethylene copolymer 25 wt % and higher, the blends retain ductility down to 0° C. Instrumented impact testing shows similar results. Notched Izod impact testing, a more rigorous measurement, also shows improved ambient and low temperature resilience with increasing amounts of semi-amorphous propylene-ethylene copolymer. The Izod data appear to be influenced by the presence/absence of clarifying agent in the blend, but at SAPEC blend levels greater than 25 wt %, high values of resilience, approaching no-break, are noted at both ambient temperature and 0° C.

A surprising observation from Table 9 is the low haze value observed for the SAPEC blends with clarifying additive (total haze 10% for Ex 4-2, 13% for Ex 4-3 13% for Ex 4-5 and 12% for Ex 4-7). These heterogeneous blends, based on propylene homopolymer matrix with dispersed semi-amorphous propylene-ethylene copolymer, display the unique combination of clarity (haze≦20% for 1 mm thick molded chip) and toughness (e.g. ductility down to 0 C). Interestingly, the haze value appears quite uniform and invariant over the range 10 wt % to 40 wt % semi-amorphous propylene-ethylene copolymer. Generally, with an increasing amount of dispersed phase, there is more scatter of light and consequently an increase in haze.

Standard heterogeneous propylene polymer blends, such as commercial Ziegler-Natta impact copolymers with ethylene-propylene rubber amounts ranging from 15 to 40 wt %, are quite opaque with high haze (approaching 100%). The high haze is primarily the result of light scattering at the interface between the phases, together with scattering from crystalline entities of the polypropylene matrix. The presence of a clarifying additive does not significantly reduce the high haze value.

To obtain low haze levels with heterogeneous propylene polymer blends, one could adjust the heterophase-to-matrix viscosity and/or density ratio (e.g. Macromol. Symp. 78, 213-228, 1994). Specifically, EP 0 373 660 teaches the use of a matrix of random propylene-ethylene (and/or higher alpha-olefin) copolymer, rather than propylene homopolymer, and low amounts of ethylene-based elastomer (2 to 30% by weight of the elastomer phase). EP 0 373 660 teaches that if the ethylene content of the elastomer phase is "less than 20% or more than 70% by weight, the impact resistance and/or transparency are unsatisfactory" (page 3, lines 14, 15). In the products of present Example 4, the ethylene content of the semi-amorphous propylene-ethylene copolymer (SAPEC-2) is 14.9 wt %, the matrix is a homopolymer and low haze is maintained even at >30 wt % of the dispersed phase.

The heterogeneous blends of Example 4 also show surprisingly good blush resistance (very low stress-whitening). The data are shown in Table 10. Stress-whitening, or blushing, in heterogeneous propylene copolymers is caused by the formation of voids or crazes during the deforming of a specimen, upon application of a stress. Light is diffracted from the crazes and voids giving rise to the whitening, which presents an undesirable appearance. The standard approach to minimize stress-whitening is to use a high ethylene-containing copolymer rubber phase or to add polyethylene to the composition (reference: Polypropylene Handbook, edited by E. P. Moore, Jr., Hanser, 1996). A widely-practiced, commercial route to manufacture blush-resistant impact copolymers is to polymerize some polyethylene (e.g. HDPE) in a tail reactor, following the production of the copolymer rubber component.

The Test Procedure used to measure blush resistance was as follows: An injection molded ASTM specimen (e.g. Gardner disk), 125 mil (3.18 mm) thick, is impacted with a 4 lb (1.82 kg) weight from a height of 5 in (ie. 20 in.lb or 2.26 J), using a falling-weight impact tester. The impact of the tup weight is utilized to induce stress-whitening in the specimen, if it is susceptible. After impact, the specimen is aged for 24 hour. After aging, color readings are taken on the specimen at the impact area and outside the impact area, using a Hunter ColorQuest XE colorimeter. The calorimeter is set up for Hunter lab readings using illuminant D65/10°. D65 or $D_{65}$ is the most commonly used daylight illuminant, representing noon daylight. 10 refers to the angular coverage (i.e. 10°) by the illuminant. A reading is taken with the disk's impact area centered over the reflectance port. A reading is also taken outside the impact area. The degree of stress-whitening is judged as the difference between the "L" readings of the two measurements. Hunter "L" is a measure of the black-white color spectrum (L=100 white, L=0 black). If a sample displays stress-whitening, the "L" value on the impact area will be higher (whiter) than the "L" value on the non-impact area and a positive ΔL ("L" on impact area–"L" on non-impact area) will be obtained. The values for ΔL provide a means for comparing the relative susceptibility to stress-whitening among a set of samples. Three specimens per sample are generally tested and the "L" values averaged.

TABLE 10

Stress-Whitening of Heterogeneous Blends (Hunter "L" Color)

| | "L" non-impact area | "L" impact area | ΔL | Observable stress-whit'ng |
|---|---|---|---|---|
| PP7033 | 66 (68) | 94 (99) | 28 (31) | Yes |
| Example 4-1 | 75 (70) | 61 (63) | −14 (−7) | No |
| Example 4-2 | 37 (38) | 41 (42) | 4 (4) | Slight |
| Example 4-3 | 57 (60) | 49 (51) | −8 (−9) | No |
| Example 4-4 | 51 (52) | 52 (51) | 1 (−1) | No |
| Example 4-5 | 71 (71) | 61 (61) | −10 (−10) | No |
| Example 4-6 | 71 (71) | 59 (60) | −12 (−11) | No |
| Example 4-7 | 82 (81) | 69 (69) | −13 (−12) | No |

Notes:
i. PP7033 (8 MFR, 17% EP copolymer rubber containing 52% ethylene) is a commercial polypropylene impact copolymer available from ExxonMobil Chemical Company, Houston, TX.
ii. Numbers within parentheses are for measurements where the side away from the impact indentation is adjacent to the reflectance port. Numbers not within parentheses are for measurements where the impact side is adjacent to the reflectance port. As the data show, the measured values are not significantly affected.

Table 10 shows the heterogeneous Example blends to display very low, if any, stress-whitening, in comparison with a standard Ziegler-Natta heterogeneous copolymer of comparable rubber content. Thus commercial impact copolymer PP7033 showed significant stress-whitening as noted by the color difference (Δ"L") after and before application of the stress, which was confirmed by visual observation of the specimen. By contrast, almost all the Example blends show no indications of stress-whitening. Visually, only a slight blush was observed with 10% of the semi-amorphous propylene-ethylene polymer. This behavior for the Example blends is surprising, since the semi-amorphous propylene-ethylene copolymer rubber (SAPEC-2) component in these blends contains so little ethylene (14.9 wt %). Also, the observation of no stress-whitening increase with increasing amounts of SAPEC in the blends (up to 40 wt %) is surprising.

In summary, the heterogeneous, semi-amorphous propylene-ethylene copolymer blends described in the Examples display a novel properties profile of good impact toughness down to 0° C. and below, clarity, and blush (stress-whitening) resistance, despite containing very low levels of ethylene. This property combination is believed to result from the unique morphology formed from blends of polypropylene with the semi-amorphous propylene-ethylene copolymers.

All patents and patent applications, test procedures (such as ASTM methods), and other documents cited herein, including priority documents, are fully incorporated by reference to the extent such disclosure is not inconsistent with this invention and for all jurisdictions in which such incorporation is permitted. When numerical lower limits and numerical upper limits are listed herein, ranges from any lower limit to any upper limit are contemplated.

The invention claimed is:

1. A molded article comprising a heterogeneous blend comprising:
   1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 200 dg/min or less; and
   2) from 1 to 40 weight % of one or more semi-amorphous polymers (based upon the weight of the semi-crystalline and semi-amorphous polymers), each semi-amorphous polymer comprising propylene and from 10 to 25 weight % of one or more C2 and/or C4 to C10 alpha-olefin comonomers, said semi-amorphous polymers each having:
      a) a heat of fusion of 4 to 70 J/g; and
      b) a melt flow rate of 0.1 to 200 dg/min; and
      c) an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
      d) an Mw/Mn of 1.5 to 4, and
      e) a propylene triad tacticity, as measured by $^{13}$C NMR, of 75% or greater, and
   where the blend has:
      i) a melt flow rate of 0.5 to 200 dg/min; and
      ii) less than 5 weight % filler, based upon the weight of the polymers and the filler; and
      iii) a permanent set of greater than 65%; and
      iv) a haze of 20% or less on a 1 mm injection molded chip; and
   the molded part has:
      a) a thickness of 250 µm to 10 mm; and
      b) a notched Izod impact strength at 23° C. of 80 J/m or more; and
      c) a notched Izod impact strength at 0° C. of 27 J/m or more; and
      d) a 1% secant flexural modulus of 1035 MPa or lower; and
      e) an ultimate elongation where greater than 50% of 5 test specimens suffer no break through extension to 1000%; and
      f) a resistance to stress whitening of Hunter color ΔL of 15 or lower.

2. The molded article of claim 1 wherein the molded article has a ΔL of 10 or lower.

3. The molded article of claim 1 wherein the molded article has a ΔL less than 5.

4. The molded article of claim 1 wherein the molded article has a ΔL less than zero.

5. The molded article of claim 1 wherein the molded article has a ΔL that is less than 10, a 1% secant flexural modulus less than 865 MPa, a notched Izod impact at 23° C. of greater than 160 J/m, a notched Izod impact at 0° C. of greater than 40 J/m and the blend has a haze less than 18%.

6. The molded article of claim 1 wherein the molded article has a ΔL that is less than 10, a 1% secant flexural modulus less than 690 MPa, a notched Izod impact at 23° C. of greater than 320 J/m, a notched Izod impact at 0° C. of greater than 160 J/m and the blend has a haze less than 15%.

7. The molded article of claim 1 wherein the blend has dispersions of semi-amorphous polymer less than 4 µm in size in a continuous phase of semi-crystalline polymer.

8. The molded article of claim 1 wherein the blend has dispersions of semi-amorphous polymer less than 3 µm in size in a continuous phase of semi-crystalline polymer.

9. The molded article of claim 1 wherein the blend has dispersions of semi-amorphous polymer less than 2 µm in size in a continuous phase of semi-crystalline polymer.

10. The molded article of claim 1 wherein the blend has dispersions of semi-amorphous polymer less than 1 µm in size in a continuous phase of semi-crystalline polymer.

11. The molded article of claim 1 where the blend has a haze of 15% or less.

12. The molded article of claim 1 where the blend has a haze of 12% or less.

13. The molded article of claim 1 wherein the blend has a haze of 10% or less.

14. The molded article of claim 1 wherein the blend has a permanent set of 85% or more.

15. The molded article of claim 1 wherein the blend has a permanent set of 100% or more.

16. The molded article of claim 1 wherein the blend has a permanent set of 125% or more.

17. The molded article of claim 1 wherein the blend has a permanent set of 150% or more.

18. The molded article of claim 1 wherein the blend has a haze less than 15% and a ΔL of less than 10.

19. The molded article of claim 1 wherein the blend has a 1% Secant flexural modulus below 690 MPa.

20. The molded article of claim 1 wherein the blend has a 1% Secant flexural modulus below 414 MPa.

21. The molded article of claim 1 wherein the blend has a melt flow rate of 0.1 to 100 dg/min.

22. The molded article of claim 1 wherein the blend has a melt flow rate of 0.5 to 50 dg/min.

23. The molded article of claim 1 wherein the blend has a melt flow rate of 0.5 to 30 dg/min.

24. The molded article of claim 1 wherein the semi-crystalline polymer comprises propylene and from 1 to 3 weight % of a C2 to C10 alpha olefin comonomer.

25. The molded article of claim 24 wherein the alpha-olefin comonomer is selected from the group consisting of ethylene, butene, pentene, hexene, heptene, octene, nonene, and decene.

26. The molded article of claim 24 wherein the alpha-olefin comonomer is selected from the group consisting of ethylene, butene, hexene, and octene.

27. The molded article of claim 24 wherein the alpha-olefin comonomer is ethylene.

28. The molded article of claim 1 wherein the semi-crystalline polymer comprises 0 weight % comonomer.

29. The molded article of claim 1 wherein the semi-crystalline polymer has a melting point of 120 to 170° C.

30. The molded article of claim 1 wherein the semi-crystalline polymer has an Mw/Mn between 1.5 and 4.

31. The molded article of claim 1 wherein the semi-amorphous polymer comprises propylene and from 10 to 20 weight % of a C2 to C10 alpha olefin comonomer.

32. The molded article of claim 31 wherein the alpha-olefin comonomer is selected from the group consisting of ethylene, butene, pentene, hexene, heptene, octene, nonene, and decene.

33. The molded article of claim 31 wherein the alpha-olefin comonomer is selected from the group consisting of ethylene, butene, hexene, and octene.

34. The molded article of claim 31 wherein the alpha-olefin comonomer is ethylene.

35. The molded article of claim 1 wherein the semi-amorphous polymer has a percent crystallinity of between 2 and 25%.

36. The molded article of claim 1 wherein the semi-amorphous polymer has a melt flow rate of 1 to 40 dg/min.

37. The molded article of claim 1 wherein the semi-amorphous polymer has a melting point between 30 and 80° C.

38. The molded article of claim 1 wherein the semi-amorphous polymer has a tacticity index of from 4 to 12.

39. The molded article of claim 1 wherein the semi-amorphous polymer has a triad tacticity of 80% or greater.

40. The molded article of claim 1 wherein the semi-amorphous polymer has a triad tacticity of 85% or greater.

41. The molded article of claim 1 wherein the semi-amorphous polymer has a triad tacticity of 90% or greater.

42. The molded article of claim 1 wherein the semi-amorphous polymer has a triad tacticity of 90% or greater and the haze is less than 20%.

43. The molded article of claim 1 wherein the semi-amorphous polymer has an intermolecular composition distribution of 90% or more by weight of the polymer isolated as one or two adjacent, soluble fractions with the balance of the polymer in immediately preceding or succeeding fractions; and wherein each of these fractions has a weight % comonomer content with a difference of no greater than 20 wt % (relative) of the average weight % comonomer of the copolymer.

44. The molded article of claim 1 wherein the semi-amorphous polymer has an intermolecular composition distribution of 85% or more by weight of the polymer isolated as one or two adjacent, soluble fractions with the balance of the polymer in immediately preceding or succeeding fractions; and wherein each of these fractions has a weight % comonomer content with a difference of no greater than 15 wt % (relative) of the average weight % comonomer of the copolymer.

45. The molded article of claim 1 wherein the semi-amorphous polymer has an intermolecular composition distribution of 85% or more by weight of the polymer isolated as one or two adjacent, soluble fractions with the balance of the polymer in immediately preceding or succeeding fractions; and wherein each of these fractions has a weight % comonomer content with a difference of no greater than 10 wt % (relative) of the average weight % comonomer of the copolymer.

46. The molded article of claim 1 wherein the semi-amorphous polymer has an intermolecular composition distribution of 90% or more by weight of the polymer isolated as one or two adjacent, soluble fractions with the balance of the polymer in immediately preceding or succeeding fractions; and wherein each of these fractions has a weight % comonomer content with a difference of no greater than 10 wt % (relative) of the average weight % comonomer of the copolymer.

47. The molded article of claim 1 wherein the molded article has a notched Izod impact strength at 23° C. of 107 J/m or more.

48. The molded article of claim 1 wherein the molded article has a notched Izod impact strength at 23° C. of 160 J/m or more.

49. The molded article of claim 1 wherein the molded article has a notched Izod impact strength at 23° C. of 320 J/m or more.

50. The molded article of claim 1 wherein the molded article has a notched Izod impact strength at 0° C. of 40 J/m or more.

51. The molded article of claim 1 wherein the molded article has a notched Izod impact strength at 0° C. of 53 J/m or more.

52. The molded article of claim 1 wherein the molded article has a notched Izod impact strength at 0° C. of 107 J/m or more.

53. The molded article of claim 1 wherein the molded article has a notched Izod impact strength at 0° C. of 160 J/m or more.

54. The molded article of claim 1 wherein the molded article has a notched Izod impact strength at 0° C. of 320 J/m or more.

55. The molded article of claim 1 wherein the molded article has a Gardner impact strength at 23° C. of 11.3 J or more.

56. The molded article of claim 1 wherein the molded article has a Gardner impact strength at 23° C. of greater than 22.6 J.

57. The molded article of claim 1 wherein the molded article has a Gardner impact strength at 0° C. of 5.6 J or more.

58. The molded article of claim 1 wherein the molded article has a Gardner impact strength at 0° C. of 11.3 J or more.

59. The molded article of claim 1 wherein the molded article has a Gardner impact strength at 0° C. of greater than 22.6 J.

60. The molded article of claim 1 wherein the molded article has an instrumented impact strength at 23° C. of 10 J or more.

61. The molded article of claim 1 wherein the molded article has an instrumented impact strength at 23° C. of 20 J or more.

62. The molded article of claim 1 wherein the molded article has an instrumented impact strength at 23° C. of 30 J or more.

63. The molded article of claim 1 wherein the molded article has an instrumented impact strength at 0° C. of 5 J or more.

64. The molded article of claim 1 wherein the molded article has an instrumented impact strength at 0° C. of 10 J or more.

65. The molded article of claim 1 wherein the molded article has an instrumented impact strength at 0° C. of 20 J or more.

66. The molded article of claim 1 wherein the molded article has an instrumented impact strength at 0° C. of 30 J or more.

67. The molded article of claim 1 wherein the molded article has a 1% secant flexural modulus at 23° C. of below 863 MPa.

68. The molded article of claim 1 wherein the molded article has a 1% secant flexural modulus at 23° C. of below 690 MPa.

69. The molded article of claim 1 wherein the molded article has a 1% secant flexural modulus at 23° C. of below 414 MPa.

70. The molded article of claim 1 wherein the molded article has a 1% secant flexural modulus at 23° C. of below 380 MPa.

71. The molded article of claim 1 wherein the molded article has a thickness of from 254 μm to 5 cm.

72. The molded article of claim 1 wherein the molded article has a thickness of from 750 μm, to 1 cm.

73. The molded article of claim 1 wherein the molded article has a thickness of from 1200 μm to 5 mm.

74. The molded article of claim 1 wherein the molded article has a thickness of from 2500 μm to 3 mm.

75. The molded article of claim 1 wherein the semi-amorphous polymer comprises from 11 to 25 weight % comonomer and is present at from 15 to 40 weight %, and wherein the blend has dispersions of semi-amorphous polymer less than 4 μm in size in a continuous phase of semi-crystalline polymer and wherein the molded article has:
   a) a thickness of 254 μm to 5 mm; and
   b) a notched Izod impact strength at 23° C. of 96 J/m or more; and
   c) a notched Izod impact strength at 0° C. of 45 J/m or more; and
   d) a 1% secant flexural modulus at 23° C. of 800 MPa or lower; and
   e) a Gardner impact strength at 23° C. of 23 J or more; and
   f) a Gardner impact strength at 0° C. of 15 J or more; and
   g) an instrumented impact strength at 23° C. of 20 J or more.

76. The molded article of claim 1 wherein the semi-amorphous polymer comprises from 11 to 25 weight % comonomer and is present at from 25 to 40 weight %, and wherein the blend has dispersions of semi-amorphous polymer less than 4 μm in size in a continuous phase of semi-crystalline polymer and wherein the molded article has:
   a) a thickness of 254 μm to 5 mm; and
   b) a notched Izod impact strength at 23° C. of 320 J/m or more; and
   c) a notched Izod impact strength at 0° C. of 160 J/m or more; and
   d) a 1% secant flexural modulus at 23° C. of 660 MPa or lower; and
   e) a Gardner impact strength at 23° C. of 23 J or more; and
   f) a Gardner impact strength at 0° C. of 23 J or more; and
   g) an instrumented impact strength at 23° C. of 30 J or more.

77. The molded article of claim 1 wherein the blend of the semi-amorphous and semi-crystalline polymers further comprises plasticizer.

78. The molded article of claim 77 wherein the plasticizer comprises poly-alphaolefin.

79. The molded article of claim 78 wherein the poly-alpha-olefin comprises polydecene.

80. The molded article of claim 1 wherein the heterogeneous blend further comprises slip agent.

81. The molded article of claim 80 wherein the slip agent comprises 50 to 5000 ppm of an amides having the chemical structure $CH_3(CH_2)_7CH=CH(CH_2)_xCONH_2$ where x is 5 to 15.

82. The molded article of claim 1 wherein the heterogeneous blend further comprises from 10 ppm to 10 weight % of a clarifyng agent.

83. The molded article of claim 82 wherein the clarifying agent comprises 50 to 4000 ppm of an organophosphate, phosphate ester, sodium benzoate, talc, sorbitol, adipic acid, benzoic acid, a metal salts of adipic acid, a metal salt of benzoic acid, an inorganic fillers, or a Ziegler-Natta olefin product or other highly crystalline polymers.

84. The molded article of claim 82 wherein the clarifying agent comprises 50 to 4000 ppm of a sorbitol-based agent, an aluminum salt based agent, or a sodium salt based agent.

85. The molded article of claim 82 wherein the clarifying agent comprises 50 to 4000 ppm of disodium[2.2.1]heptane bicyclodicarboxylate, bis (3,4 dimethylbenzylidene)sorbitol, sodium 2,2'-methylene-bis(4,6-di-tert-butylphenyl)phosphate, (p-chloro, p'methyl)dibenzylidene sorbitol, bis(p-ethylbenzylidene)sorbitol, 1,2,3,4-dibenzylidene sorbitol, 1,2,3,4-di-para-methylbenzylidene sorbitol, and or aluminum 2,2'-methylene-bis(4,6-di-tert-butylphenyl)phosphate.

86. A package comprising the molded article of claim 1.

87. The molded article of claim 76 wherein the blend has a haze of 15% or less on a 1 mm injection molded chip, and wherein the molded article has:
   a) an ultimate elongation at 23° C. of greater than 1000%,
   b) a 1% secant flexural modulus at 23° C. of 540 MPa or less,
   c) a notched Izod impact strength at 0° C. of greater than 320 J/m;
   d) a Gardner impact strength at 0° C. of greater than 26 J, where failure, if any, is in the ductile mode,
   e) an instrumented impact strength at 0° C. of greater than 30 J where failure, if any, is in the ductile mode, and
   f) a resistance to stress whitening of Hunter color ΔL of less than 10.

* * * * *